(12) United States Patent
Barabas et al.

(10) Patent No.: US 8,935,225 B2
(45) Date of Patent: *Jan. 13, 2015

(54) PERSISTENT DATA STORAGE TECHNIQUES

(71) Applicant: Miosoft Corporation, Madison, WI (US)

(72) Inventors: Albert B. Barabas, Fitchburg, WI (US); Ernst M. Siepmann, Pembroke Pines, FL (US); Mark D. A. van Gulik, Madison, WI (US)

(73) Assignee: Miosoft Corporation, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/828,209

(22) Filed: Mar. 14, 2013

(65) Prior Publication Data

US 2013/0212588 A1 Aug. 15, 2013

Related U.S. Application Data

(63) Continuation of application No. 12/711,402, filed on Feb. 24, 2010, now Pat. No. 8,489,567, which is a continuation of application No. 10/821,586, filed on Apr. 9, 2004, now Pat. No. 7,689,560, which is a continuation of application No. 09/687,941, filed on Oct. 13, 2000, now abandoned.

(51) Int. Cl.
*G06F 17/30* (2006.01)
*G06F 9/46* (2006.01)

(52) U.S. Cl.
CPC ............ *G06F 9/46* (2013.01); *G06F 17/30362* (2013.01); *G06F 17/30607* (2013.01); *Y10S 707/99938* (2013.01)

USPC .................................. 707/704; 707/999.008

(58) Field of Classification Search
CPC ............................. G06F 9/46; G06F 17/30607
USPC .................................................. 707/781, 704
See application file for complete search history.

(56) References Cited

U.S. PATENT DOCUMENTS

| 4,249,241 A | 2/1981 | Aberle et al. |
| 4,389,706 A | 6/1983 | Gomola et al. |

(Continued)

FOREIGN PATENT DOCUMENTS

| JP | 06-19861 | 1/1994 |
| JP | 06-332780 | 12/1994 |

(Continued)

OTHER PUBLICATIONS

Alami et al., "Highly Parallel Computing", The Benjamin/Cummings Publishing Company, Redwood City, 1994; pp. 153-170 and 262-264 (1994).

(Continued)

*Primary Examiner* — Baoquoc N To
(74) *Attorney, Agent, or Firm* — Fish & Richardson P.C.

(57) ABSTRACT

A database is maintained that stores data persistently. Tasks are accepted from task sources. At least some of the tasks have competing requirements for use of regions of the database. Each of the regions includes data that is all either locked or not locked for writing at a given time. Each of the regions is associated with an available processor. For each of the tasks, jobs are defined each of which requires write access to regions that are to be accessed by no more than one of the processors. Jobs are distributed for concurrent execution by the associated processors.

14 Claims, 13 Drawing Sheets

(56) References Cited

U.S. PATENT DOCUMENTS

| | | | |
|---|---|---|---|
| 5,146,561 A | | 9/1992 | Carey et al. |
| 5,179,637 A | * | 1/1993 | Nardozzi ............... 358/1.15 |
| 5,197,137 A | | 3/1993 | Kumar et al. |
| 5,241,675 A | | 8/1993 | Sheth et al. |
| 5,303,368 A | | 4/1994 | Kotaki |
| 5,404,521 A | | 4/1995 | Murray |
| 5,434,994 A | | 7/1995 | Shaheen et al. |
| 5,437,032 A | | 7/1995 | Wolf et al. |
| 5,442,791 A | | 8/1995 | Wrabetz et al. |
| 5,448,727 A | | 9/1995 | Annevelink |
| 5,504,894 A | | 4/1996 | Ferguson et al. |
| 5,524,212 A | | 6/1996 | Somani et al. |
| 5,551,027 A | | 8/1996 | Choy et al. |
| 5,557,770 A | * | 9/1996 | Bhide et al. ............ 711/161 |
| 5,611,049 A | | 3/1997 | Pitts |
| 5,630,124 A | | 5/1997 | Coyle et al. |
| 5,664,186 A | | 9/1997 | Bennett et al. |
| 5,666,514 A | | 9/1997 | Cheriton |
| 5,675,802 A | | 10/1997 | Allen et al. |
| 5,678,026 A | | 10/1997 | Vartti et al. |
| 5,692,178 A | | 11/1997 | Shaughnessy |
| 5,692,183 A | | 11/1997 | Hapner et al. |
| 5,727,203 A | | 3/1998 | Hapner et al. |
| 5,734,899 A | | 3/1998 | Yoshizawa et al. |
| 5,745,913 A | * | 4/1998 | Pattin et al. ............ 711/105 |
| 5,748,468 A | | 5/1998 | Notenboom et al. |
| 5,758,149 A | | 5/1998 | Bierma et al. |
| 5,806,065 A | | 9/1998 | Lomet |
| 5,815,710 A | | 9/1998 | Martin et al. |
| 5,819,066 A | | 10/1998 | Bromberg et al. |
| 5,822,584 A | | 10/1998 | Thompson et al. |
| 5,832,484 A | | 11/1998 | Sankaran et al. |
| 5,864,851 A | | 1/1999 | Breitbart |
| 5,872,969 A | | 2/1999 | Copeland et al. |
| 5,881,284 A | | 3/1999 | Kubo |
| 5,887,143 A | * | 3/1999 | Saito et al. ............ 709/248 |
| 5,907,848 A | | 5/1999 | Zaiken et al. |
| 5,918,243 A | * | 6/1999 | Giordano et al. ......... 711/112 |
| 5,924,103 A | | 7/1999 | Ahmed et al. |
| 5,933,825 A | | 8/1999 | McCaughry et al. |
| 5,940,828 A | | 8/1999 | Anaya et al. |
| 5,956,704 A | | 9/1999 | Gautam et al. |
| 5,987,477 A | | 11/1999 | Schmuck et al. |
| 5,987,506 A | | 11/1999 | Carter et al. |
| 5,999,931 A | | 12/1999 | Breitbart |
| 6,029,174 A | | 2/2000 | Sprenger |
| 6,047,289 A | | 4/2000 | Thorne |
| 6,049,809 A | | 4/2000 | Raman et al. |
| 6,081,801 A | | 6/2000 | Cochrane et al. |
| 6,110,220 A | * | 8/2000 | Dave et al. ............ 716/105 |
| 6,178,542 B1 | * | 1/2001 | Dave ..................... 716/105 |
| 6,216,126 B1 | | 4/2001 | Ronstrom |
| 6,253,209 B1 | | 6/2001 | Chase-Salernoe et al. |
| 6,256,635 B1 | | 7/2001 | Arrouye et al. |
| 6,266,673 B1 | | 7/2001 | Hong et al. |
| 6,269,432 B1 | | 7/2001 | Smith |
| 6,310,704 B1 | | 10/2001 | Dogan et al. |
| 6,374,256 B1 | | 4/2002 | Ng et al. |
| 6,374,266 B1 | | 4/2002 | Shnelvar |
| 6,389,422 B1 | | 5/2002 | Doi et al. |
| 6,397,270 B1 | | 5/2002 | Cheswick |
| 6,411,951 B1 | | 6/2002 | Galindo-Legaria et al. |
| 6,411,954 B1 | | 6/2002 | Roffe et al. |
| 6,438,538 B1 | | 8/2002 | Goldring |
| 6,442,748 B1 | | 8/2002 | Bowman-Amuah |
| 6,477,617 B1 | | 11/2002 | Golding |
| 6,507,847 B1 | | 1/2003 | Fleischman |
| 6,557,082 B1 | | 4/2003 | Josten et al. |
| 6,662,203 B1 | | 12/2003 | Kling et al. |
| 6,687,257 B1 | | 2/2004 | Balasubramanian |
| 6,769,124 B1 | | 7/2004 | Schoening et al. |
| 6,792,432 B1 | | 9/2004 | Kodavalla et al. |
| 6,823,355 B1 | | 11/2004 | Novaes et al. |
| 6,965,892 B1 | | 11/2005 | Uceda-Sosa et al. |
| 6,993,762 B1 | | 1/2006 | Pierre |
| 7,089,253 B2 | | 8/2006 | Hinshaw et al. |
| 7,587,428 B2 | | 9/2009 | Barabas et al. |
| 7,689,560 B2 | | 3/2010 | Barabas et al. |
| 8,489,567 B2 | | 7/2013 | Barabas et al. |
| 2003/0037048 A1 | | 2/2003 | Kabra et al. |
| 2004/0267807 A1 | | 12/2004 | Barabas et al. |
| 2010/0153397 A1 | | 6/2010 | Barabas et al. |
| 2010/0191705 A1 | | 7/2010 | Barabas et al. |

FOREIGN PATENT DOCUMENTS

| | | |
|---|---|---|
| JP | 07-219792 | 8/1995 |
| JP | 09-016453 | 1/1997 |
| JP | 09-022356 | 1/1997 |
| JP | 10-083336 | 9/1998 |
| JP | 2000-137688 | 5/2000 |

OTHER PUBLICATIONS

Flanagan et al., "A Testbed for Experiments with Concurrency Control Primitives in Persistent Systems," *IEEE*, 154-157 (1993).

Mohan et al., "Parallel Processing: Algorism and Architecture of Parallel Database Management System (DBMS) (Part 1) and (Part 2)," *Nikkei Electronics*, 618:99-118 (Sep. 26, 1994), and 619:113-119 (Oct. 10, 1994), Nikkei Business Publications, Inc., Japan [with English translation], 52 pages.

Nakatsu, "A New Algorithm for the Serializability Testing," IEICE Transactions, J76-D-1(6):279-287, IEICE, Japan (Jun. 25, 1993).

Saisho, "Concurrency Control for Parallel transactions," *IEICE Technical Report*, 90(144):13-18, the IEICE, Japan, (Jul. 20, 1990) (English translation).

Terry et al., "Managing Update Conflicts in Bayou, a Weakly Connected Replicated Storage System," 1995 Association for Computing Machinery, pp. 1-12.

Office Action for App. Ser. No. JP 2000-352662, dated Jun. 15, 2010 (with English translation), 2 pages.

Office Action for App. Ser. No. JP 2000-352662, dated Feb. 4, 2011 (with English translation), 7 pages.

Office Action for App. Ser. No. JP 2000-352662, dated Nov. 9, 2011 (with English translation), 4 pages.

Office Action for App. Ser. No. JP 2000-352662, dated Oct. 30, 2012 (with English translation), 15 pages.

Office Action for App. Ser. No. JP 2012-066070, dated Aug. 15, 2012 (with English translation), 7 pages.

Office Action for App. Ser. No. JP 2012-066070, dated Feb. 19, 2013 (with English translation), 6 pages.

Application, pending claims for U.S. Appl. No. 12/535,834, filed Aug. 5, 2009.

U.S. Appl. No. 09/687,941, filed Oct. 13, 2000.
U.S. Appl. No. 09/688,309, filed Oct. 13, 2000.
U.S. Appl. No. 09/687,027, filed Oct. 13, 2000.
U.S. Appl. No. 09/687,942, filed Oct. 13, 2000.
U.S. Appl. No. 09/687,861, filed Oct. 13, 2000.
U.S. Appl. No. 09/687,765, filed Oct. 13, 2000.
U.S. Appl. No. 09/687,694, filed Oct. 13, 2000.
U.S. Appl. No. 09/687,268, filed Oct. 13, 2000.

Office Action for Japanese App. Ser. No. 2013-222462, dated Sep. 8, 2014, 11 pages.

\* cited by examiner

PERSISTENT DATA STORAGE TECHNIQUES

CROSS REFERENCE

This application is a continuation of U.S. application Ser. No. 12/711,402, filed Feb. 24, 2010, which is a continuation of U.S. application Ser. No. 10/821,586, filed Apr. 9, 2004 (now U.S. Pat. No. 7,689,560), which is a continuation of U.S. application Ser. No. 09/687,941, filed Oct. 13, 2000, the entire contents of all above references are incorporated herein by reference.

FIELD

This invention relates to persistent data storage techniques.

BACKGROUND

A large-scale database system may contain millions of records that are accessible to millions of users. Potentially, tens of thousands of data accesses on the records may take place every second. The database system may include data storage devices accessed by processes running on multiple processors. The storage devices and processors can be distributed in various locations connected via networks. For example, a large retail business could have a first storage device that maintains names and addresses of its customers, a second storage device that maintains inventory lists, and a third storage device that maintains purchasing history of its customers. The first storage device is located in Boston, the second one in Los Angeles, and the third one in Chicago. Each storage device is managed by a different processor, which is connected to the others by a wide area network (WAN). When a customer Lisa places an order for a coffee table, for example, through a clerk in a call processing center operated by the retail business, the clerk has to check, via the WAN, if the coffee table is available from the storage device in Los Angeles. The clerk may also need to access the storage devices in the other locations to retrieve Lisa's address for shipping and update her purchasing history. At the same time, another customer Robyn may place an order for the same coffee table through another clerk in the call processing center. Both clerks will be reading from the same storage device and trying to update the same inventory record for the coffee table.

In the above example, the three different storage devices contain different types of data records that usually can be accessed independently. Using multiple processors, as in the above example, can improve the performance of the database system in terms of throughput and load-balancing, as long as data accesses are independent and each access can run on a different processor in parallel.

Because a distributed database system is accessible by multiple processes, conflicts may occur if the processes are not properly coordinated. Examples of conflicts include: two processes attempting to update the same record at the same time with two different values (as in the coffee table example); a process attempting to read a record that is being deleted by another process; and a process attempting to update a record that links to a related record being updated by another process. When a conflict happens, the operations of processes that access the same or related data records may interleave in an unpredictable way, such that the results of the operations may be incorrect and may destroy the data consistency of the database system.

One approach for resolving conflicts uses a semaphore that locks a data piece (e.g., a variable, a customer record, or a department database) when a process is accessing a data entry within the data piece, and releases the lock when the process finishes the access. All other processes must check this semaphore before accessing the data piece to see if any process is currently using it. This approach may require millions of locks on millions of data pieces if the granularity of data pieces that can be locked is small, or may block large numbers of accesses if the granularity of data pieces is large, because locking an entire department database, for example, prevents efficient parallel execution of jobs that access disjoint data sets that happen to be stored in the same department database.

In addition to conflicts, a large-scale database system may also suffer from inefficient data access. To avoid searching the entire database system just to locate a data record in a storage device, a summary information (e.g., a table of content, an index, or a cross-reference) of data records is usually provided in an easy-to search format. However, the summary information may be subject to corruption unless its consistency with the data records is always enforced. Furthermore, the tasks of updating the summary information may also create conflicts, and therefore must be scheduled effectively.

SUMMARY

In general, in one aspect, the invention features a method that includes maintaining a database that stores data persistently; accepting tasks from task sources, at least some of the tasks having competing requirements for use of regions of the database, each of the regions including data that is all either locked or not locked for writing at a given time; associating each of the regions with an available processor; defining, for each of the tasks, jobs each of which requires write access to regions that are to be accessed by no more than one of the processors; and distributing the jobs for concurrent execution by the associated processors.

In general, in another aspect, the invention features apparatus that includes a database that stores data persistently, and a job processing mechanism that (1) accepts an arbitrarily large number of tasks asynchronously from an arbitrarily large number of task sources, at least some of the tasks having competing requirements for use of regions of the database, each of the regions including data that is all either locked or not locked for writing at a given time, (2) organizes the regions into non-conflicting contention spaces each associated with a different available processor, (3) decomposes each of the tasks into jobs each of which requires write access to regions belonging to no more than one of the contention spaces, and (4) distributes the jobs to the corresponding contention spaces for concurrent execution by the associated processors.

In general, in another aspect, the inventions features a software object configured to be executed on a machine. The object includes a job to be executed, the job requiring access to a region of a database that stores data persistently, the job including instructions and pointers to data in the region of the database, and an index that identifies a contention space of jobs that have competing requirements to write into the region of the database, the index distinguishing the contention space from other contention spaces of jobs that do not have competing requirements to write into the region of the database.

In general, in another aspect, the invention features a queue that includes cells arranged in rows and columns. The cells in the rows are configured to receive jobs for writing data in a persistent database. The cells in the columns are configured to deliver jobs for processing by processors. A queue control mechanism locks all of the cells of a row only for writing, when the jobs are being written into the row, and locks only one of the cells of a column for writing when jobs are being delivered from the column. The number of rows in the queue are sufficient so that, at one time, jobs can be written to at least one of the rows and every processor can receive jobs from one of the columns.

In general, in another aspect, the invention features a method that includes maintaining a database that stores data persistently and provides a primary level of guarantee that data written in a requested transaction is not lost once the transaction is committed; accepting tasks from task sources for concurrent execution by multiple processors, at least some of the tasks having conflicting requirements to write into the same region of the database; and providing a software mechanism that guarantees, as least to the primary level of guarantee, that the tasks will be executed without loss of data and without the occurrence of any actual conflict with respect to the region of the database.

Other features and advantages of the invention will become apparent from the description and the claims.

DESCRIPTION

Figure 9:
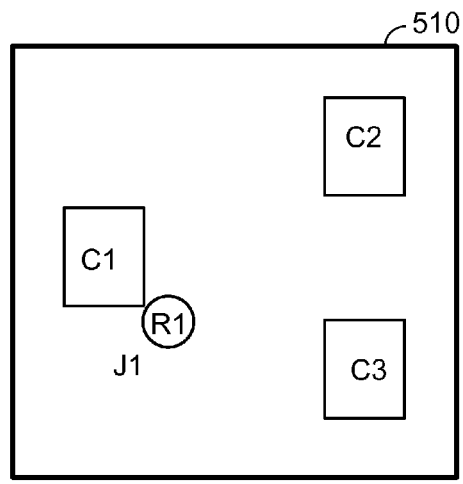
Figure 9:
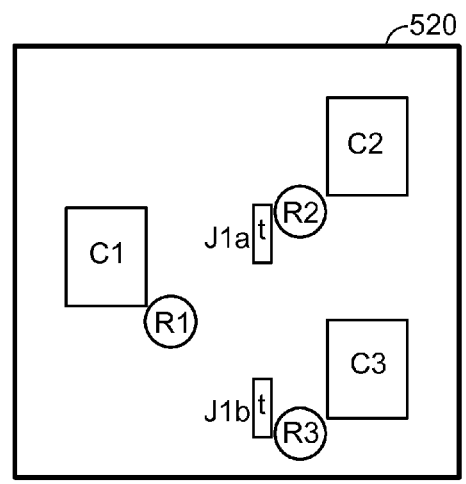
Figure 9:
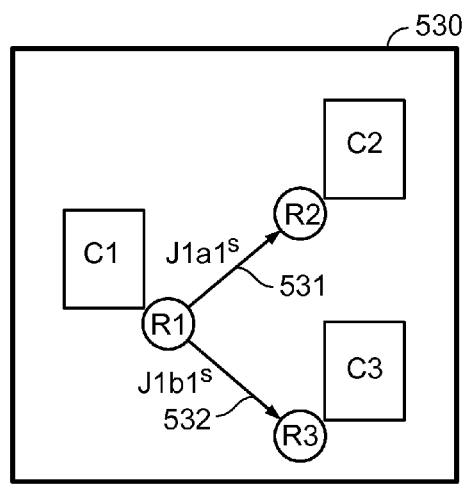
Figure 9:
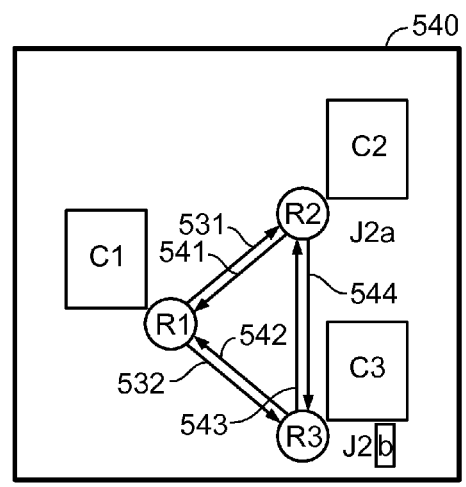
Figure 10:
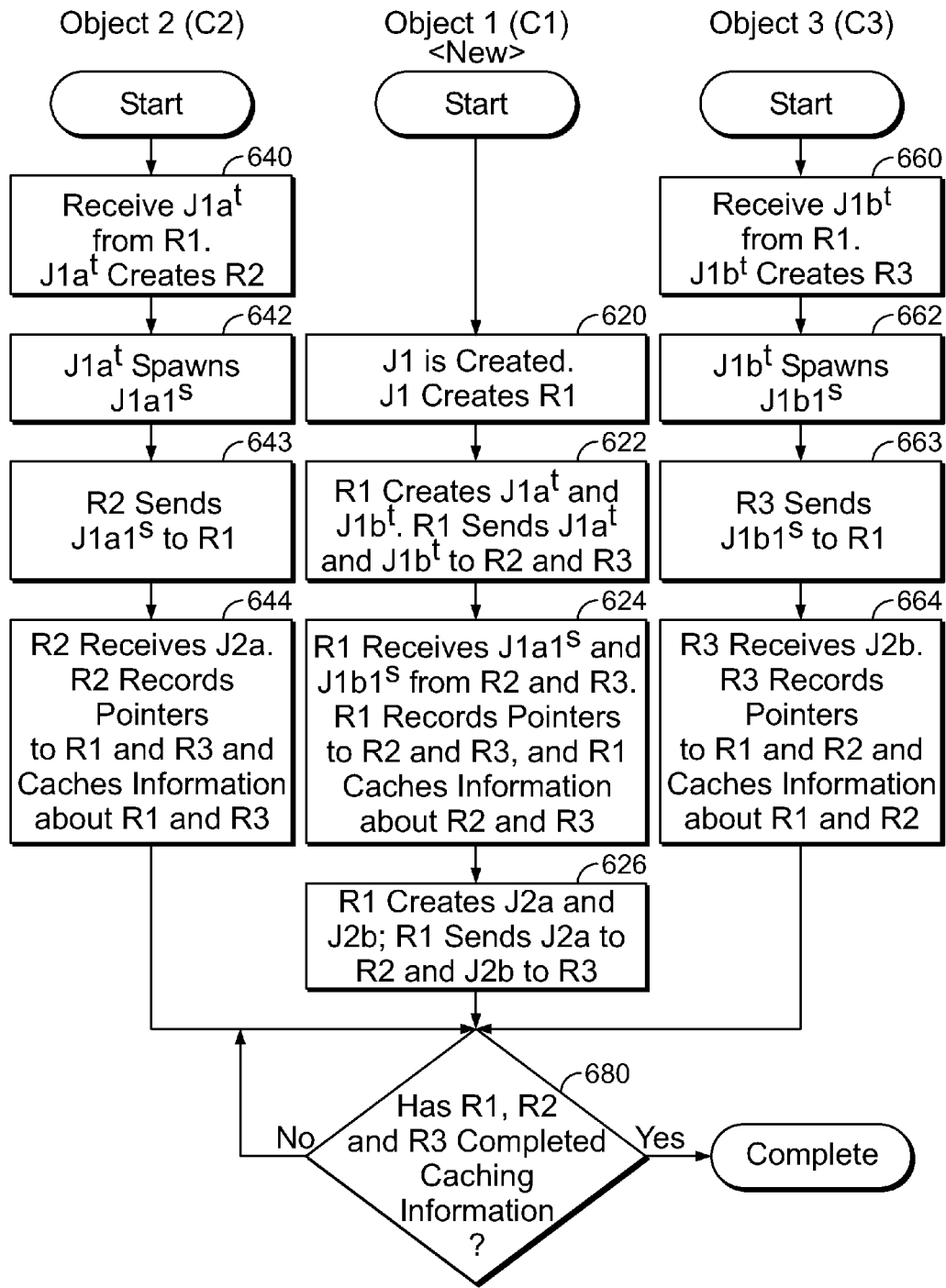
Figure 11:
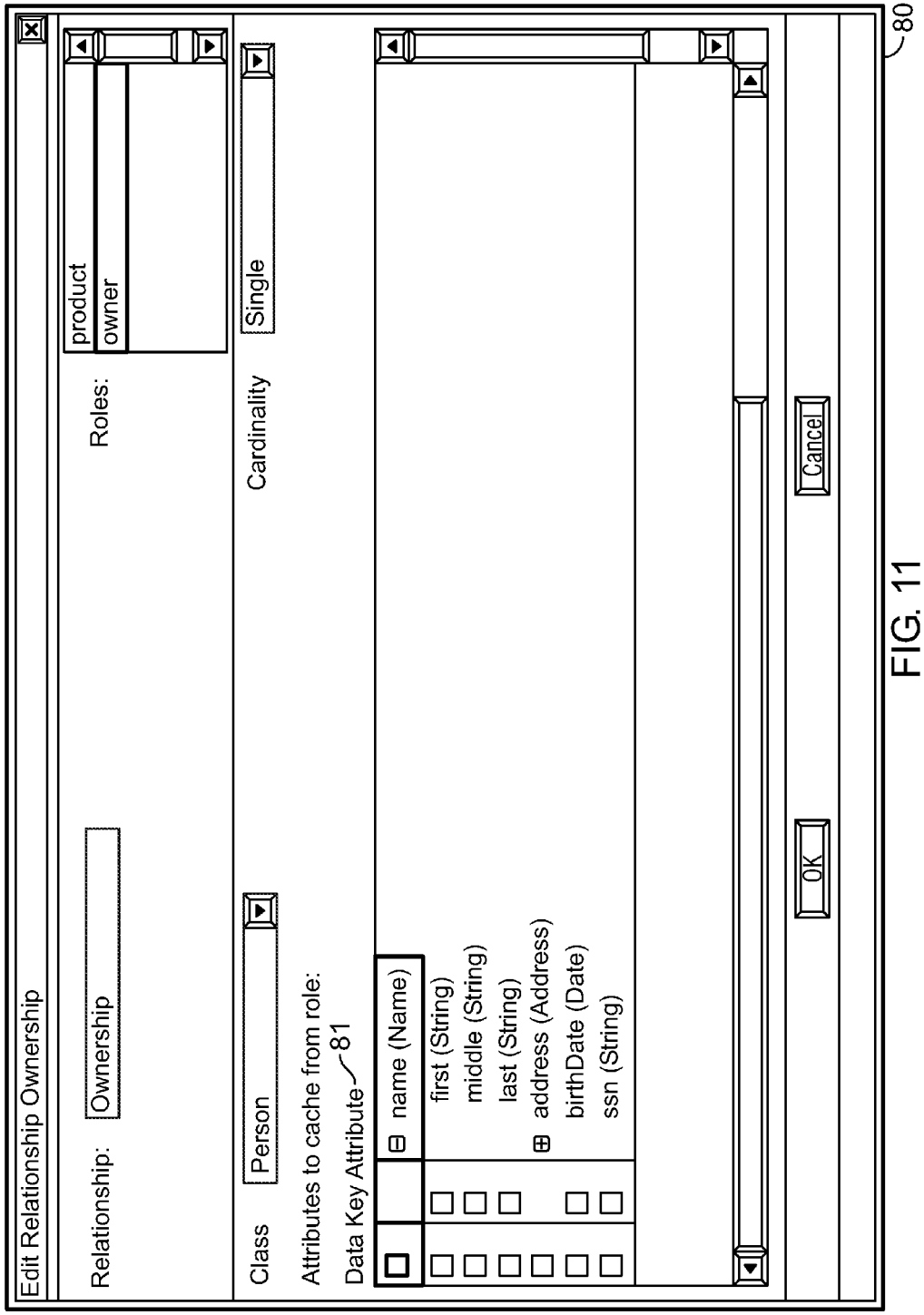
Figure 12:
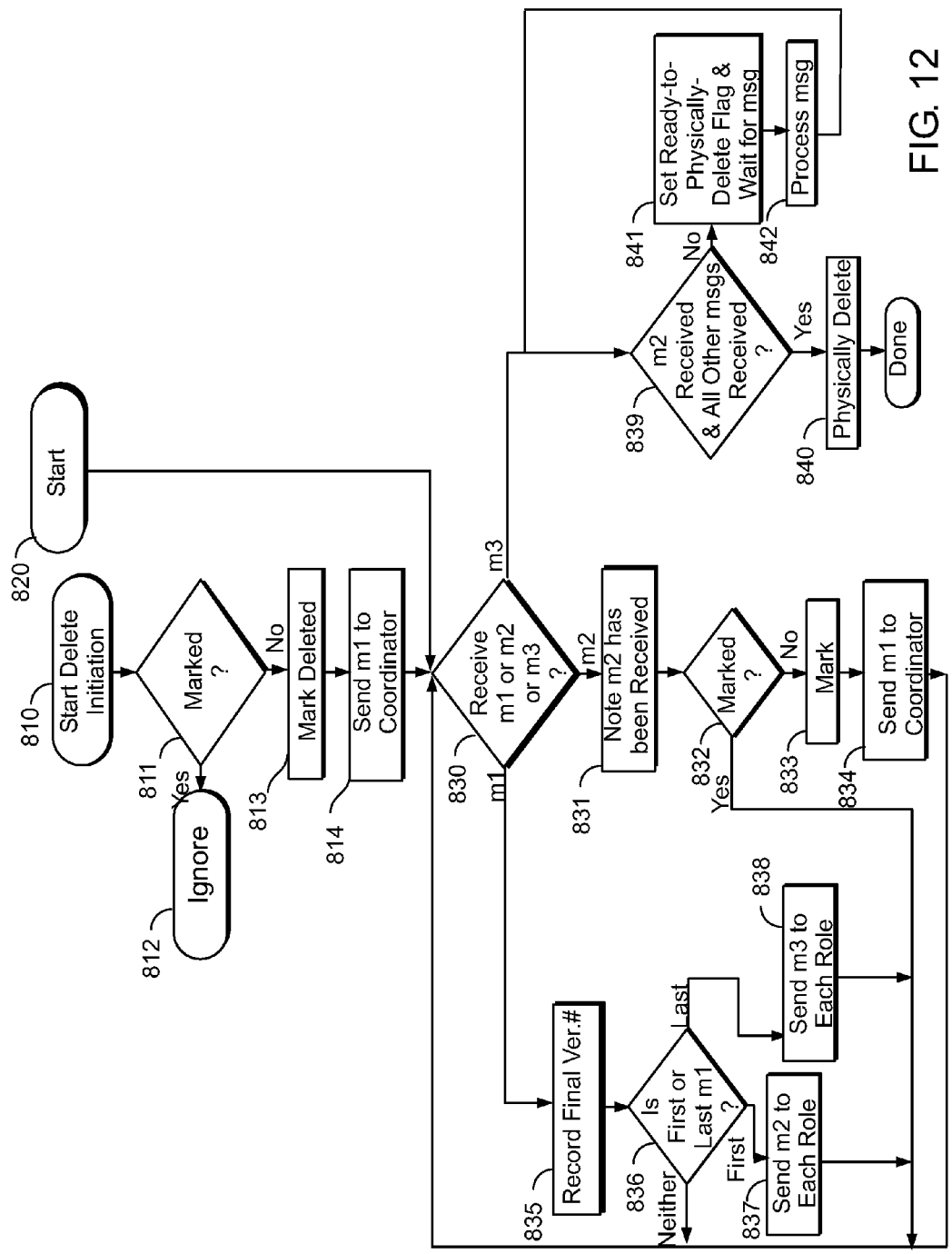
Figure 13C:
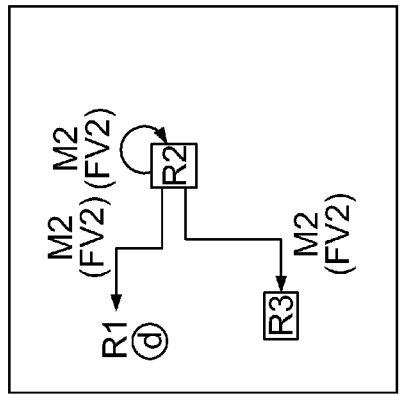
Figure 13F:
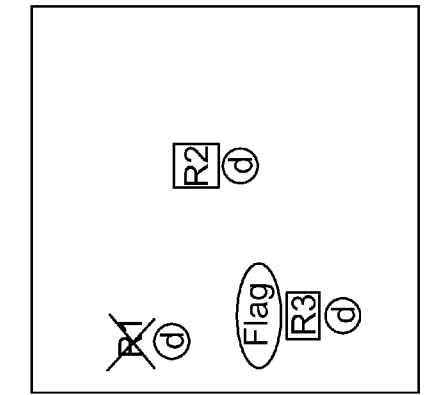
Figure 13B:
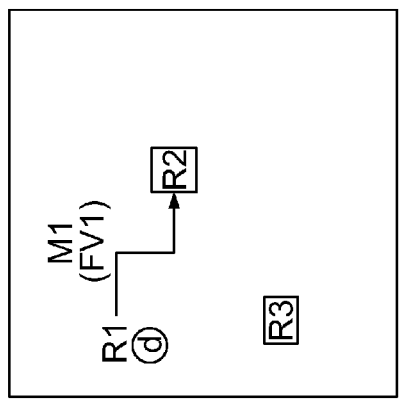
Figure 13E:
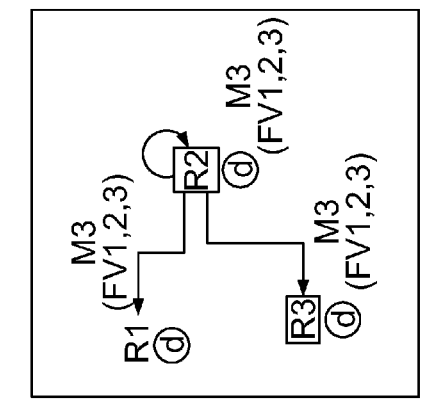
Figure 13A:
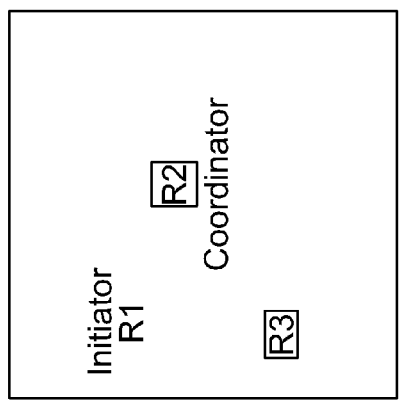
Figure 13D:
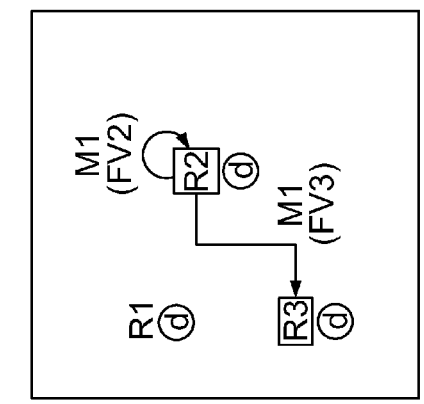

FIG. 9(1)-(4) illustrate the process for establishing a relationship;

FIG. 10 is flowchart of the process for establishing a relationship;

FIG. 11 illustrates a user interface for selecting cache variables for a role;

FIG. 12 is flowchart of the process for deleting a relationship;

FIG. 13(*a*)-(*f*) illustrate the sequence of messages sent among three roles for deleting a relationship.

Figure 1:
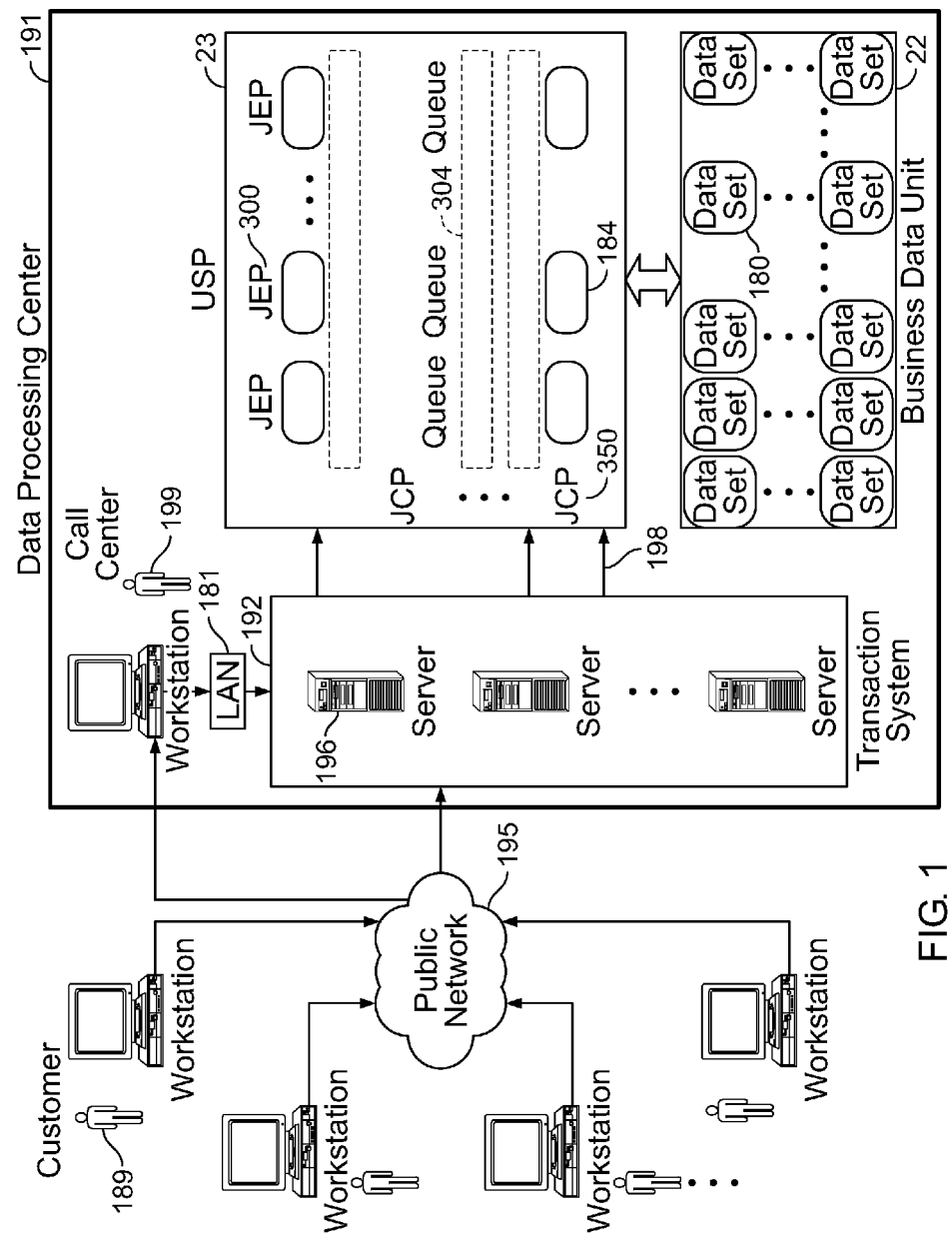
FIG. 1 is a diagram illustrating a data processing center using an update stream processor.

Referring to FIG. 1, a data processing center 191 includes a transaction system 192, a Business Data Unit (BDU) 22, and an update stream processor (USP) 23. Transaction system 192 is accessible via networks including a public network 195 (such as the Internet) and a local area network (LAN) 181 by potentially millions of users, who may be for example, customers with computers 189 or call center operators 199 of a large retail business that operates data processing center 191. The users submit requests, which may be merchandise orders or address updates, for example, through their respective workstations.

Transaction system 192 includes one or more servers 196 that run an application program (not shown) that communicates with the workstations, receives requests from the users, and automatically translates the requests to tasks or job instructions 198. A request, for example, may be a purchase order of a blue sweater for a person named Bill. A request is in a pre-defined electronic format, and a job instruction 198 is in a form recognizable to processes in USP 23 that create jobs. The processes that create jobs for USP 23 are called job creation processes (JCPs) 350, or producers.

A job created by JCP 350 is in the form of a job object. A job object includes a data structure that points to one or more objects stored in BDU 22. The job object also contains instructions executed by the job execution process (JEP) that act on the BDU objects. Because there is a one-to-one relationship between a job and a job object, we will refer, hereafter, to a job object as a job.

A task is like a job in that it is also an object that contains instructions to be executed by the JEP but it does not necessarily point to objects stored in the BDU. A task can spawn jobs if necessary and can send an acknowledgment back to the application program when the task and all spawned jobs are complete. If the task is to provide an acknowledgement then the mechanism and necessary parameters for transmitting the acknowledgment are recorded in the task object. A task can also provide an acknowledgment that it has been received and is guaranteed to execute.

As an important step in making sure that the execution of one job will not conflict with the execution of another job, the application program of transaction system 192 assigns the job an integer called a contention index, included in job instruction 198. Each contention index represents a pre-partitioned disjoint data set of BDU 22, e.g., a data set 180. The pre-partitioning uses an algorithm defined before any objects are added to BDU 22. The algorithm is designed to achieve optimal load-balancing for job executions on the BDU objects. Tasks can be assigned to arbitrary contention spaces since they do not access the BDU object directly.

Within each data set 180, BDU objects relate to one another in the sense that when a JEP 300 accesses an object in a data set, conflict may occur if another process accesses another object in that data set. Jobs of the same contention index may require related objects in the same data set 180 to be accessed and therefore must be executed in serial; jobs of different contention indexes can be executed in parallel (concurrently) to increase throughput.

A large job may be divided into one or more steps. For example, suppose a job loads a bulk file containing one million records in BDU 22. The job may be divided into one million steps, with each of the steps loading one of the one million records. Typically, there are not a lot of computations in a step; therefore a step can be executed in a small fraction of time compared to execution time for the entire job. The job is responsible to maintain enough state, which includes updating a variable containing the file position after every step, to ensure continuous operations after a fault. Periodically, but between steps, JEP 300 commits a transaction containing the results of the completed steps, and begins a new transaction. A transaction is committed when the results of the completed steps are successfully written and stored into BDU 22. During the time JEP 300 commits the current transaction, the state of the running job including the file position is updated. If a fault occurs, the job would have enough information to position the file to the last recorded position in a recovery procedure.

An existing job may require new jobs to be spawned by JEP 300. The spawned jobs in the sweater example may include updating the monthly gross revenue for the clothing department and updating the inventory for the blue sweater. After a job is spawned by JEP 300, the job is loaded into USP 23. To maintain consistency of the database, all jobs spawned due to the execution of a job J will be added in the same transaction to a staging cell in the contention space in which job J intends its spawned jobs to produce effects. The staging cell and the contention space will be described later.

USP 23 manages the flow of jobs, directing them to JEPs 300 for execution at a suitable time. The flow is managed to achieve high overall system throughput and data processing efficiency, and to assure that jobs executed at the same time do not conflict. With multiple processors running concurrent processes, USP 23 is responsible for keeping as many processes busy as possible, while avoiding simultaneous access to objects in a given data set 180 by multiple processes. To enable parallel execution without conflicts, jobs accessing the same data set 180 are placed into a specific queue 184 assigned to one of the JEPs 300. Because there are usually more data sets than queues, a given queue 184 may contain jobs that access more than one data set. The queue to which a job is assigned is calculated from the job's contention index. For example, suppose each queue is assigned an integer number from 0 to N−1, where N is the number of queues. A job with contention index Q will be assigned to the queue having the assigned number (Q modulo N). Thus, the potentially large number of contention indexes can be mapped to the relatively smaller number of queues.

Each queue can be viewed logically as a column. Within the column there could be jobs accessing the same data set 180, that is, jobs that may conflict. Assigning the potentially conflicting jobs the same contention index maps them to a given queue 184 executed by a single JEP 300. Thus, the jobs are guaranteed to be executed in serial, and therefore no conflict can happen.

On the other hand, in order to increase efficiency for processes that produce jobs, USP 23 is also logically organized into rows 304, each of which is illustrated in FIG. 1 as a stripe over all the queues. Each row has a row control object that can be locked to indicate that the row is being accessed by a process. A write lock is requested when a process wishes to add jobs to a row. The row can alternatively be read locked by JEP 300 when it wishes to fetch jobs in the row for execution. The operations of adding and fetching jobs using the locks will be described later. If enough rows are provided, it will at all times be possible to find an unlocked row without waiting for one to become available.

After jobs are produced, they are loaded into one row at a time. A producer of jobs must find an unlocked row, lock the row, load the jobs into the row, and then release the lock. Within row 304, jobs are placed into queues determined by their respective contention indexes. In this manner, all producers may write jobs into the queues at the same time without causing conflicts as long as there are enough rows.

Figure 2:
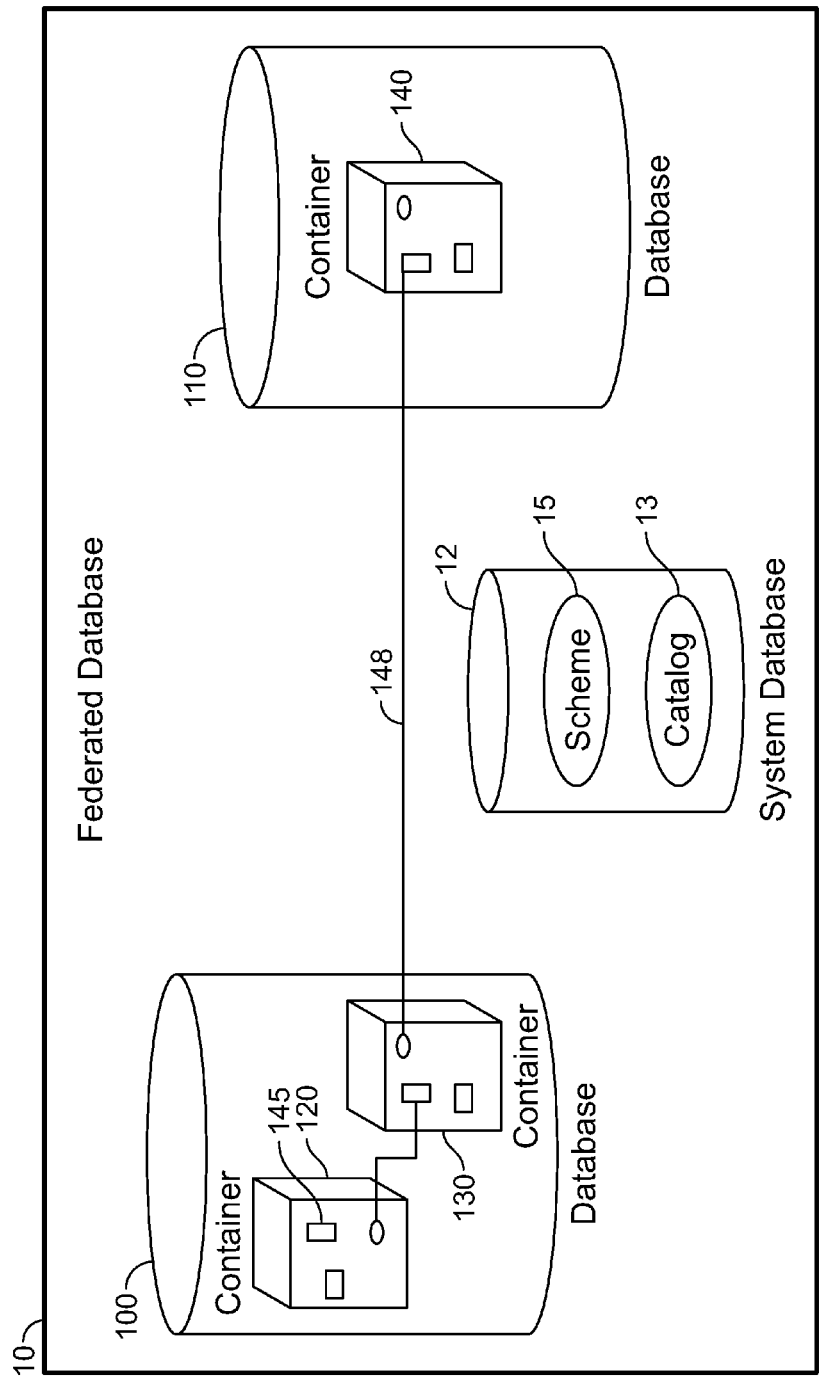
FIG. 2 is a diagram of a federated database.

In some implementations, USP 23 and BDU 22 are part of a database organization called a federated database (Objectivity/DB Administration, Release 5, February 1998, Objectivity Incorporated). Referring to FIG. 2, a federated database 10 contains a number of database units (two units 100 and 110 are shown). Each database unit has a number of containers 120, 130, and 140. Federated database 10, database units (100 and 110), and containers (120, 130 and 140) are basic constructs of a distributed, scalable object database called Objectivity/DB®, which is commercially available from Objectivity Incorporated.

Federated database 10 is the highest level in the Objectivity/DB® logical storage hierarchy. Although federated database 10 appears in FIG. 2 as one entity, it can be distributed across multiple data storage devices in different locations that are connected via networks.

Physically, federated database 10 exists as a federated database file (not shown). Federated database 10 contains a system database 12, which stores a schema 15 for federated database 10, as well as a catalog 13 of the additional databases 100, 110 that make up the federation. Federated database 10 is assigned a unique integer that identifies it to Objectivity/DB® processes (not shown), e.g., a lock server process (a service that Objectivity/DB® clients connect to for coordinating locking of objects in databases).

Each database 100, 110 is at the second highest level in the Objectivity/DB® logical storage hierarchy. Database 100 stores a user application's persistent data, for example, customer address data for a retail business. Database 100 is physically represented by a database file (not shown). Each database is attached to exactly one federated database and is listed in that federated database's catalog 13. Database files and their associated federated database file may reside on different machines. In addition to having a physical filename, database 100 also has a system name, which can be specified by a system manager of federated database 10. The system name of database 100 is a logical name within federated database 10.

The containers 120 within a database 100 hold fundamental units of persistent data called objects (145, for example). A container 120 determines the physical clustering of objects. A container 120 is also the fundamental unit of locking—when any object in a container 120 is locked, the lock is applied to the entire container, effectively locking all objects in the container.

The container-level granularity can benefit overall performance, because a lock managing process only needs to manage relatively few container-level locks rather than potentially millions or billions of object-level locks. FIG. 2 shows that objects may be clustered in separate containers and yet still reference one another (148).

For example, data set 180 of FIG. 1 and FIG. 2 may contain a number of BDU databases 100, and each of the BDU databases 100 may contain tens of thousands of BDU containers 120. Each BDU container 120 stores objects 145 holding personal or business records, as well as links 148 between the objects.

Alternatively, object 145 may represent a job performing a write operation, such as creating, deleting, or modifying an object in BDU 22. The BDU object receiving (i.e., affected by) the write operation must have the same contention index as object 145. On the other hand, a job performing a read operation as part of its activity can read from any database. A mechanism for managing read operations without conflicting with a write operation is readily available from Objectivity MROW[1] (multiple readers one writer).

Figure 3:
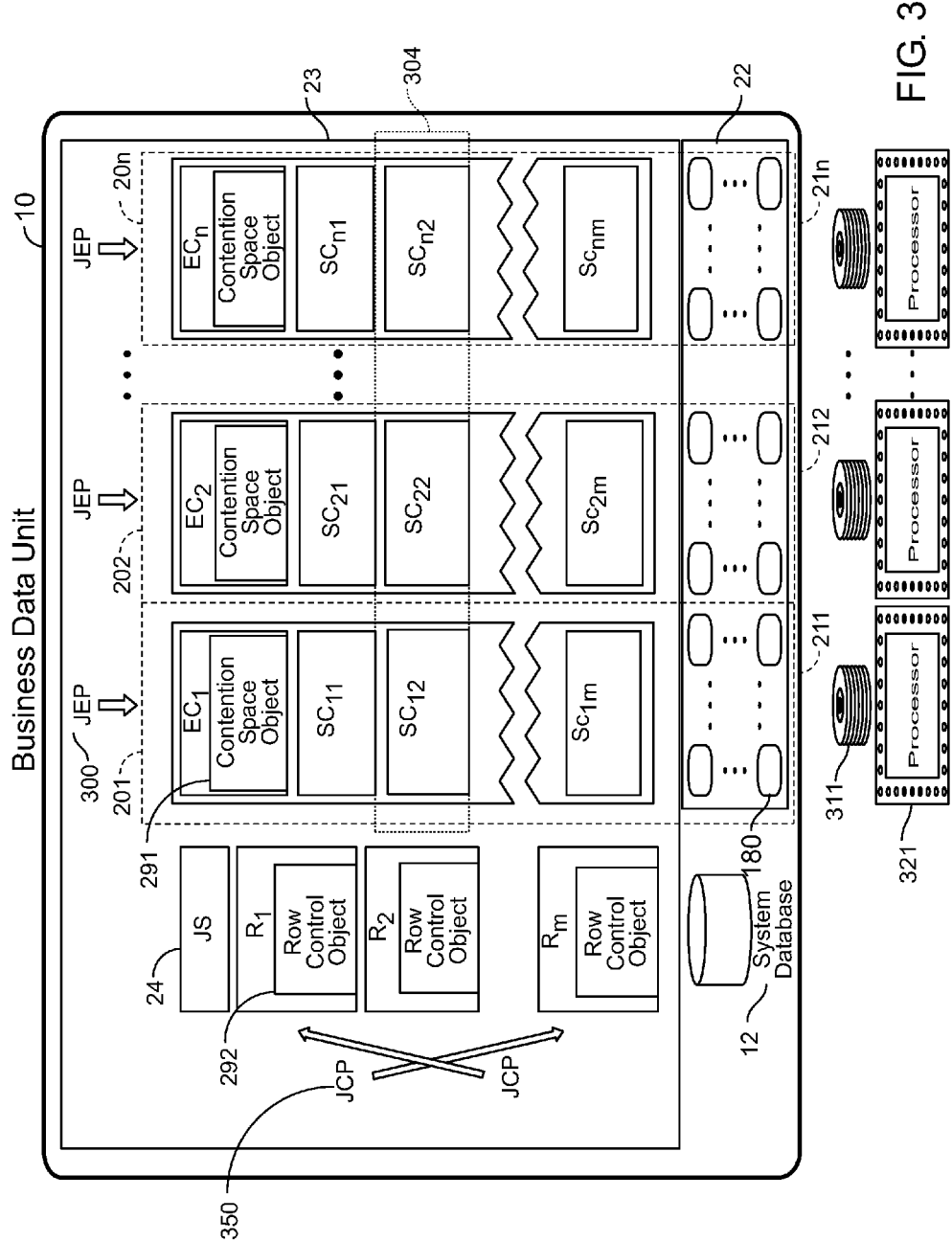
FIG. 3 is a diagram of an update stream processor.
Figure 4:
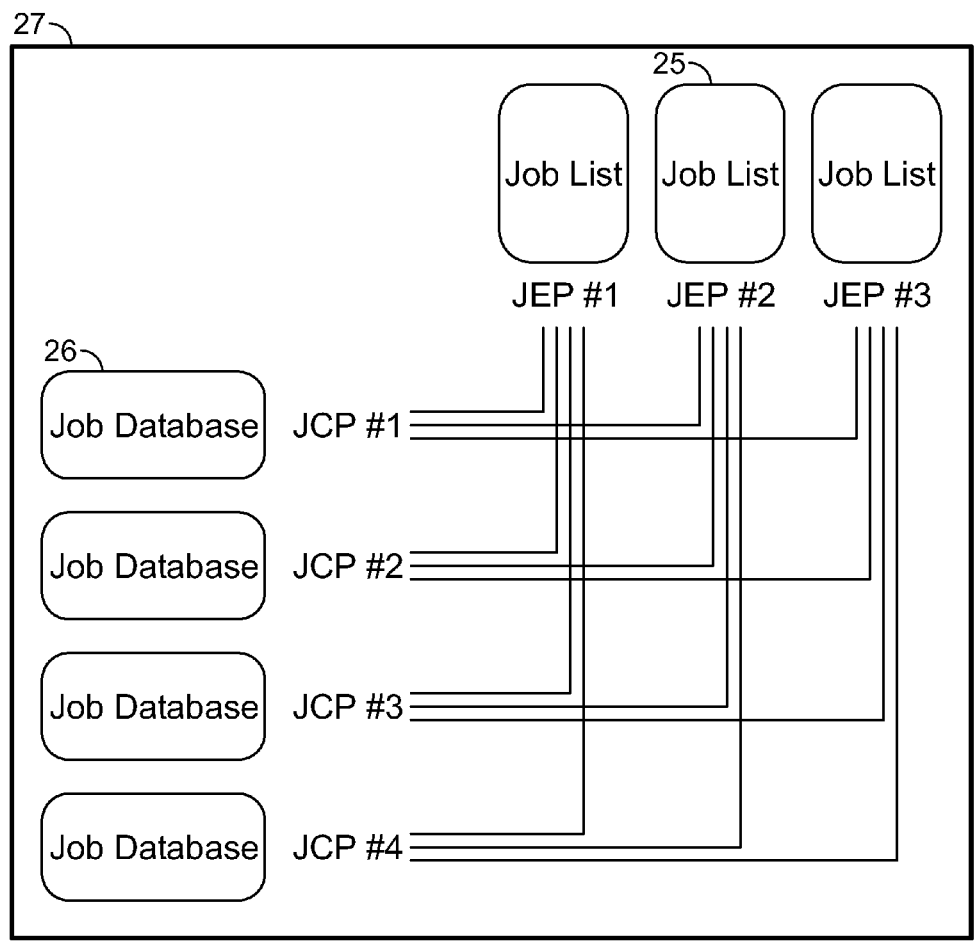
FIG. 4 is a diagram illustrating an alternative design for an update stream processor.

FIG. 3 shows an embodiment of a federated database 10 that includes a system database 12, a BDU 22, and a USP 23. USP 23 is organized as a matrix having (n+1) logical columns and (m+1) logical rows. The number of columns and rows required for USP 23 to avoid conflict at all times will be described later.

A logical column of USP 23 and corresponding data sets 180 of BDU 22 form a database (201, 202, . . . 20n), with each database representing a contention space (211, 212, . . . 21n). One of the logical columns, the leftmost column in FIG. 3, is stored in a root database 24. Each logical column, except for the one representing root database 24, includes a logical cell called an execution cell (EC), and m logical cells called staging cells (SC).

A logical row 304 of USP 23 is a logical unit for managing the accesses to the row's constituent cells. In FIG. 3, row 304 holds staging cells $SC_{12}, SC_{22}, \ldots SC_{n2}$.

Each logical cell, whether an execution cell or a staging cell, is a container that holds job objects. A staging cell is where JCP 350 places a job after the job is created, and is also where JEP 300 receives jobs for transferring to an execution cell. The execution cell holds ready jobs, running jobs, and waiting jobs. The staging cell holds jobs that are loaded from JCP 350.

Root database 24 includes a Job Scheduler (JS) container and m row containers ($R_1, R_2, \ldots R_m$). Each row container has a row control object 292 that keeps a list of the constituent staging cells of the row. Row control object 292 is used as a handle for a write lock or a number of read locks for the row. A list of constituent cells for each contention space is kept in a contention space object 291 stored in the execution cell container of that contention space. The information about all of the row control objects 292 and contention space objects 291 is kept in the JS container.

Databases (201, for example) are located in data storage devices (e.g., disks 311) accessible by respective processors (e.g., processor 321). Preferably, each column database is stored on a separate disk, and each processor runs only a single JEP 300. For example, database 201 resides on a disk 311 accessible by a processor 321 running a JEP 300. This arrangement keeps network traffic low and reduces disk thrashing, thus improving the network latency and increasing the throughput.

The physical placement of root database 24 is not critical to the performance, because the containers in root database 24 are infrequently read or written.

JEPs 300 may be assigned to process jobs in logical columns of USP 23 using a one-to-one mapping, i.e., one JEP per column. However, other types of mapping can be implemented to allow scalability and load-balancing. For example, allowing one JEP for multiple columns may enhance the scalability of USP 23 in terms of the number of processors, processes or columns. The arrangement of one JEP for multiple columns has a benefit that when the number of processors changes, the number of columns in the USP and the number of JEPs per processor can stay the same, and therefore requires less effort to scale the number of processors used by USP 23. Furthermore, job loads may be balanced out across multiple columns assigned to the same JEP, multiple JEPs running on the same processor, or a combination of both. On the other hand, allowing multiple JEPs per column may improve the performance of USP 23. With the arrangement of multiple JEPs per column, only one JEP is designated as the execution process to prevent conflict while other JEPs only provide assistance (e.g., pre-fetching jobs) to speedup the execution.

To avoid all contention and assure that no process waits on a locked row, at least C+P rows and C columns are required for a USP having C JEPs and P JCPs. C columns are required to assure that each JEP has jobs available at a given time. C+P rows are required so that every JCP and every JEP can find a row available at any given time to load new jobs into. Taking into account the JS container, the row containers, and the column containers, the total number of containers required to avoid contention and eliminate waiting on locks is (C+P+1)(C+1). Because no process needs to wait on locks to load new jobs, the new jobs are accepted by USP 23 as soon as they are produced or spawned.

USP 23 can be implemented in a number of computer languages, including VisualWorks Smalltalk, Java or C++. Example implementations require a moderate speed network connecting several machines, with each of the machines having physical disks and processors. Each machine's disks hold columns of USP 23 that are accessible to that machine's processors.

In operation of USP 23, JEP 300 represents a consumer process that executes and then deletes jobs in USP 23. Either periodically or when the JEP's execution cell has no job ready to be executed, JEP 300 scans the rows using a round robin scheme from a random permutation of the rows. If the selected row cannot be locked, the next row selected by the permutation is attempted until a read lock is acquired on one of the rows. After a read lock is acquired, JEP 300 fetches all jobs in the staging cell located at the locked row within the designated contention space, copies the jobs to the execution cell, and deletes the jobs from the staging cell. JEP 300 then releases the read lock and begins executing one job at a time. After executing a job, but in the same transaction, JEP 300 deletes the job from the execution cell.

During the job execution, JEP 300 uses the information carried with the job to determine if the job requires any new jobs to be spawned. The new jobs spawned by JEP 300, if any, are stored in the staging cells of a row acquired by the JEP with a write lock. The staging cells are located in the contention space specified by the contention indexes of the new jobs.

A row control object (292, for example) may have multiple read locks acquired by multiple consumers at the same time, as long as each read lock is acquired by a different consumer in a separate contention space. However, row control object 292 allows only one write lock at a time, which is achieved through the default Objectivity/DB®. A write lock on a row also excludes any attempt to obtain a read lock on the same row, because read and write at the same time may create data inconsistency. Similarly, the existence of one or more read locks on a row prevents the acquisition of a write lock on the same row.

JEP 300 writes back results of job execution to a persistent memory, such as a cache memory or a disk, when committing a transaction. The transaction of a job execution is defined based on a pre-determined criterion, such as duration of execution time or number of executed steps. When the pre-determined criterion is met, for example, 10 seconds have passed since the beginning of the transaction or 500 steps of one or more jobs have been executed, JEP 300 commits a transaction. A transaction may include the execution of multiple jobs if the jobs are short. For example, one transaction might include the last half of a job, ten complete jobs, and the first half of another job.

The operations of a consumer process generally include:

1. Begin by JEP 300 selecting a job from the execution cell and sending it a #start: message. The job responds by returning a first memento, which is an object, to JEP 300. The first memento will be passed back to the job later. The first memento is transient (i.e., kept in RAM only and not stored anywhere in the federated database), and JEP 300 keeps track of it automatically.

2. Periodically, JEP 300 asks the job if it is over by sending it an #atEnd: message and passing the current memento back to the job. If the job returns a "true" indicator, a finish message is sent as explained below.

3. If the job does not return a "true" indicator, JEP 300 sends the job a #step:withScheduler: message, passing the job the current memento and information stored in the JS container. The job returns a second memento (which may be the same object as the first memento). Administrative information, such as the information stored in the JS container, is also passed to the job. The information is used if the job requires more jobs to be spawned.

4. JEP 300 then decides whether to commit a transaction of the job according to, for example, whether 10 seconds have passed since the last transaction was committed. Then JEP 300 again asks the job if it is over.

5. Once the job returns a "true" indicator, JEP 300 sends the job a #finish: message, passing the job the current memento. JEP 300 then deletes the job.

6. JEP 300 proceeds with the next job in the execution cell. If no job is ready to run in the execution cell, JEP 300 scans rows in its column for new jobs.

Execution of a job may be interrupted by a JEP failure, causing the job to be only partially executed. However, the state of the job can be recovered at least up to the time of the most recent committed transaction, because the contention space object 291 records the state of current running jobs in its execution cell container every time a transaction is committed.

The recovery procedure includes starting up a new JEP to replace the failed one, and then informing the partially executed job to restart. The recovery procedure allows the job to reset its external state if there is any. The recovery procedure is generally as follows:

1. Send the job the #restart: message. The job returns a memento for the new JEP to use in continuing execution of the job.
2. Continue at step 2 of the job execution procedure as described in the previous section.

To add a job to USP 23, a job-producing process scans the rows using a round robin scheme from a random permutation of the rows, until a write lock is successfully acquired on one of the rows. The job producing process can be JCP 350, or JEP 300 that is spawning new jobs. The job-producing process holds the write lock while the job and other jobs that are being loaded at the same time are placed into the staging cells within that row, until a job-producing transaction is over. The job-producing transaction can be defined similarly to a transaction of a job consumer. After the transaction is completed, the job-producing process releases the write lock and the jobs may be selected for execution by the respective JEPs 300 using read locks on the rows. Thus, the operations of adding a job into USP 23 generally include:

1. Acquiring a write lock on a row by acquiring a write lock on the row control object 292 of the row.
2. Adding jobs to the appropriate cells of the locked row, according to the jobs' contention indexes.
3. Releasing the write lock.

The following procedure can be used to create a USP with a name "SampleUSP".

---

UpdateStreamProcessor
createWithName: 'SampleUSP'
producers: 4
consumers: 10.

---

The procedure creates 11 databases, named "UpdateStreamProcessor SampleUSP root", "UpdateStreamProcessor SampleUSP contention space 1", "UpdateStreamProcessor SampleUSP contention space 10". The root database has a JS container and one row container for each of 10+4=14 rows. Each of the other ten databases represents a contention space, preferably stored on a disk at or near the processor assigned to process that contention space.

The following example shows an instruction of an application program, for locating the USP named SampleUSP and receiving a handle to the USP. The application program, for example, may be the one stored in transaction system 192 in FIG. 1.

js:=UpdateStreamProcessor named: 'SampleUSP'.

The above function must be called within a transaction. Once the handle is received, the application program may further instruct the processes of the USP to schedule new jobs and execute existing jobs.

The following instruction triggers a JCP 350 to lock a row and write a job into the TOW.

js currentOutputRow addJob: aJob.

The currentOutputRow is a function that finds an unlocked row, and the function is called within a job-producing transaction. Only the first request for currentOutputRow in a new transaction causes JCP 350 to find another unlocked row; repeated requests cause JCP 350 to return the same row.

Sometimes, jobs must be executed in a pre-determined order to ensure correctness of the results. A method of enforcing the pre-determined order of job execution is called synchronization. In a commercial database system, for example, there may be relationships among persons, and these persons and the associated objects may refer to each other via attributes. A proper order of job execution is required when updating the attributes, relationships, and links that relate one record to another record or person. Otherwise, the integrity of the database system may be destroyed and data consistency may be lost.

A job has a quorum fraction and a tag, both of which are used for synchronization. A job participating in synchronization can be executed only when all the other jobs participating in the same synchronization arrive in the execution cell. Jobs that participate in the same synchronization form a synchronous group identified by the tags of the jobs. If a job's tag is nil, it means that the job does not participate in any synchronization. If a job's tag is not nil, it is grouped together with other jobs with the same tag.

The quorum fraction of a job represents its proportion of a quorum in synchronization. For example, if 5 jobs need to be synchronized, each of the jobs is assigned a quorum fraction value ⅕. When the total fractions of the jobs with the same tag in the execution cell reaches one, those jobs are moved en masse from a Smalltalk dictionary in the transient memory, to a ready-to-run list stored in the execution cell. The dictionary holds a list of the jobs waiting in the execution cell. The waiting jobs are indexed by their respective tags so that jobs of a synchronous group can be easily identified. Waiting jobs are not yet ready when some jobs in their respective synchronous groups have not arrived in the execution cell.

A job with a quorum fraction of zero is invalid. An error occurs if the total quorum fraction of a group of jobs that need to be synchronized is greater than one.

Jobs of a synchronous group must be executed in the same contention space. If jobs in different contention spaces need to be executed in a certain order, token jobs can be generated to pad the quorum fraction in a given contention space to one. For example, suppose job 1 creates jobs 2 and 3, which are all in different contention spaces. Let us further suppose that job 3 must executed only after job 2 has completed. When job 3 is created, it is given a quorum fraction of ½, and a generated unique tag. When job 2 is created, it has no tag, but it knows what job 3's tag is. When job 2 executes, the last thing it does is create a token job 3a that has the same tag as job 3, and a quorum fraction of ½. Only when jobs 3 and 3a have both arrived can they execute. Note that job 3a might do nothing, other than act as the trigger that achieves a quorum fraction of 1, allowing job 3 to run.

As another example, consider a very long running job, with many steps that produce other jobs. Say that we don't want any of these spawned jobs to run until the main job has completed. We must use synchronization, because the transaction may be committed many times between steps of the main job, which allows the spawned jobs to be transmitted to their target contention space. We can give each spawned job the minimum possible quorum fraction ($2^{-32}$), and record how many jobs went to each contention space. In the last step of the main job we can send a dummy trigger job to each contention space that we sent any jobs to, using a quorum fraction that is 1 minus the total of the quorum fractions of jobs we sent to that contention space. Thus, only when these trigger jobs have been sent (which is only when the main job completes), can the previously spawned jobs start executing.

The tag carried by a job is a unique integer that identifies the job as part of a synchronous group. JEP 300 uses an associative structure in RAM to map a tag integer to a synchronous group. JEP 300 groups the jobs with the same tag together to determine the quorum. Because jobs only exist in the database for a limited amount of time until they are executed, a cyclic 64-bit counter usually suffices for the purposes of generating an integer, unique for any existing synchronous group in USP 23. To avoid contention on the counter, each contention space object 291 maintains its own 64-bit counter for the jobs spawned by the corresponding JEP 300. Each row control object 292 also holds a counter to construct tagged jobs created by JCP 350. The column number or the row number of the container holding the job can be incorporated to ensure the uniqueness of the tag. One implementation for generating an integer for a tag of a spawned job assigns a number from 0 to N−1 to each of the columns of a USP having N columns. The tag integer of a job can be generated by taking the counter value multiplied by N, and then adding the assigned column number of the container holding the job. Similar approaches can be used for generating a tag for a job created by JCP 350. A signed integer may be used to distinguish a synchronous group generated from row control object 291 and contention space object 292.

When a tag needs to be generated, JCP 350 or JEP 300 sends a message #nextUniqueInteger to row control object 292 or to contention space object 291, respectively. During the time the tag is being generated, a write lock is acquired (and is typically already acquired by a previous request) in the same transaction on the row control object 292 or contention space object 291 to prevent contention on this counter.

Instruction sent to a row control object 292 for generating a tag is:

tagInt:=js currentOutputRow nextUniqueInteger.

Instruction sent to a contention space object 291 for generating a tag is:

```
tagInt := (js contention spaces at: 5)
    nextUniqueInteger.
```

Using the quorum fractions and tags, the correct order of job executions is assured. For example, suppose a job J1 in contention space #1 creates jobs J2 and J3. These jobs run in different contention spaces (say contention spaces #2 and #3 respectively). When J2 is finished, it creates job J4. Similarly J3 creates J5. J4 and J5 are assigned to the contention space in which J1 executed. J4 and J5 have the same tag integer as each other, and each has a quorum fraction of ½. Thus, if J4 arrives first in contention space #1, it cannot be executed until J5 also arrives. Similarly, if J5 happens to arrive first, it must wait for J4 to arrive before executing.

J4 and J5 must have the same tag, but that tag must be globally unique. Therefore, it is J1's responsibility to allocate a unique integer (e.g., by asking the current output row for the next unique integer). J1 tells J2 and J3 what this integer is (note that J2 and J3 have no tag of their own, as they don't need to be synchronized). When J2 creates J4, it sets J4's tag to this integer. Similarly, J3 sets J5's tag to this same integer. J2 and J3 might also have to contain information about which contention space to send J4 and J5 to, if it's not apparent from the rest of the data J2 and J3 contain.

Example code for an application program to trigger a JCP 350 to create a pair of synchronous jobs is shown below. In the code, job1 and job2 are assigned the same contention index, the same tag, and different quorum fractions that total to 1. Both of the jobs must arrive in the execution cell of the assigned contention space before either one may be executed.

```
| row unique job1 job2 |
row := js currentOutputRow.
unique := row nextUniqueInteger.
    ← Optionally commit transaction
job1 := BeepingJob new.
job1 contentionIndex: 123.
    job1 tagInteger: unique.
job1 quorumFraction: 2/5.
row add: job1.
job2 := BeepingJob new.
job2 contentionIndex: 123.
    job2 tagInteger: unique.
job2 quorumFraction: 3/5.
"...Do anything"
row add: job2.
Commit transaction
```

After a synchronous job group arrives in the designated execution cell, a job collapsing procedure may take place before JEP 300 executes the group of jobs. The job collapsing procedure reduces multiple jobs into a single job, thus eliminating redundant jobs and simplifying repeated jobs. When a synchronous job group becomes ready to execute, JEP 300 sends a #collapseJobs: message to each of these jobs in turn, passing the collection of jobs as the argument. If one of the jobs replies with a job instead of nil, this job will be used in place of the entire group. This job will typically contain all the information found in the original group of jobs. The execution result of the new job is equivalent to the combined results of all the jobs in the synchronous group. For example, N "increment counter by one" operations can be collapsed into "increase counter by N".

An example of using synchronous job group and job collapsing is described as follows. USP 23 may run a load job that processes all records in BDU 22 to determine if there is a match between a given record and a record stored in BDU 22. For example, the given record may be a new record containing customer John's new address. The load job spawns a number of match jobs, and each of the match jobs compares specific matching attributes, such as birthday, name, social security number, or a combination of the attributes, between the given record and the stored records.

The match jobs know which record they represent, as well as how many match jobs were created for the record. When a match job finds the corresponding stored records that match the given record, it creates jobs, each of which holds one of these records, and sends them back to the contention space that started the matching. Each new job has a quorum fraction that is 1/(M*R), where M is the number of match jobs, and R is the number of records that this match job found. Note that the total of the quorum fractions of replies from any match job equals 1/M. In the case that no matching records were found, a special dummy job must be sent to indicate this, with quorum fraction 1/M.

In the example of customer John, the match jobs produced reply jobs that reference all of John's stored records. Only when all of these reply jobs have arrived back at the original contention space can they be processed. This is precisely when the sum of the quorum fractions equals 1. At this time, the match reply jobs can be collapsed into a single job that has the complete list of matching records. This data can be analyzed and merged as needed, and update jobs can then be sent to each record that needs to be modified to accommodate the changed address.

Tasks use synchronization of jobs to enable an acknowledgment to be sent after all jobs that were spawned as a result of the task's execution are completed. All spawned jobs carry the task's contention space, a unique tag and a fraction that when added to all other fractions contained in other jobs spawned by a given job will total to the spawning job's fraction. In the case of jobs spawned by the task their fractions will total to one. A quick way to generate these fractions is to take 1 divided by the number of jobs that are being spawned and multiplying this by the spawning job's fraction and using the resulting fraction in each of the spawned jobs where a task's fraction is assumed to be 1. This scheme will cause the sum of all fractions across the final jobs (jobs that do not need to spawn any further jobs to do work other than acknowledgment) to total to one. The final jobs spawn an acknowledgment job with the recorded contention space, tag and fraction as quorum fraction. When all the acknowledgment jobs arrive at the task's contention space they are collapsed and executed causing the acknowledgment to be sent to the application program.

Other implementations are within the scope of the claims.

For example, instead of using a separate execution cell, jobs that do not require synchronous executions can be executed directly from the staging cells. Synchronized jobs, however, would still have to be moved to the execution cell for execution, so that they could all be executed as a synchronous group and deleted together.

To facilitate job executions directly from a staging cell, each staging cell has a counter that indicates the number of jobs in the staging cell waiting to be executed. The counter may be a 32-bit counter that wraps around to 0 when the counter value reaches $2^{32}-1$. When JCP 350 adds a new job into a staging cell, the counter in the staging cell is incremented. Both the addition of the job and update of the counter are done in the same transaction.

Each execution cell also has similar 32-bit counters that indicate the number of completed jobs for respective staging cells. When JEP 300 completes a job execution, the associated counter in the execution cell is incremented with a MROW write. The MROW semantics allow the counter to be access simultaneously by a single writer and multiple readers. Periodically, JCP 350 examines the counters in the execution cell with a MROW read. The values of the counters are used by JCP 350 to determine how many jobs can be deleted in the respective staging cells.

When JEP 300 needs new jobs to execute, the JEP reads all jobs in the staging cell whose counter value is greater than the execution cell's counter value, taking into account that the counter can wrap to zero when it reaches its maximum value. A counter value is considered greater than another value if the (counter value−another value) modulo maximum size< (maximum size/2). For example, in the case of comparing the values of two 4-bit counters, suppose the counter value is 9, and the other value is 7. Since 9−7=2, 2 modulo 16=2, and 2 is less than (16/8), therefore, 9 is greater than 7. This subtraction also wraps; for example, (0−1) is equal to the maximum value of the counter. The workload for JEP 300 is reduced because the JEP never needs to modify the staging cells.

In a certain embodiment, the USP does not even have the matrix structure shown in FIG. 1 and FIG. 3. Instead, the USP includes job databases and their respective processes, which communicate via TCP/IP sockets. The locking operations are no longer needed because the concept of rows does not exist in this embodiment. Referring to FIG. 3A, USP 27 includes JEPs and JCPs, each of which has a job list (25) located in the memory of the same processor running the process. Job database 26 of a JCP stores backup copies of jobs that are sent to JEPs; job list 25 of a JEP tracks jobs waiting to be executed. When a JCP creates a job, a copy of the job is loaded into the JCP's job database 26 as a backup. The JCP transmits the job via a TCP/IP socket to an appropriate JEP whose contention space is specified by the job's contention index. After the JEP receives the job, it temporarily adds the job to its job list 25 waiting for execution.

A TCP/IP socket is a software entity that allows an application program to send and receive TCP/IP messages over a network. Using the TCP/IP sockets, jobs may be sent and received as TCP/IP messages, thus hiding network details from the programmers of the system.

Each JCP has a socket connection to each JEP, through which it can transmit jobs that must be executed by that JEP. Jobs from a particular JCP destined for a particular JEP are all transmitted through the same socket connection, and are assigned consecutive job ID numbers, modulo $2^{32}$.

USP 27 utilizes the concept of an "autonomous partition" implemented by Objectivity/DB®. An autonomous partition is basically a subset of databases of a federated database. Each database belongs to exactly one autonomous partition. In this variation of the USP, each process can operate in its own autonomous partition. Database writes can be constrained as local to the database controlled by its associated executing process, thus greatly reducing network traffic and safely isolating failure of any processor until that processor is recovered. As a result of reduced network traffic, the autonomous partitions also reduce the undesired effects of deployment on a Wide Area Network (WAN) that spans across distant geographic sites. The undesired effects include higher cost of transmitting data and higher expected failure rate of communication links, as compared to a Local Area Network (LAN). Because of the reduced network traffic, the autonomous partitions not only lower the cost for deployment on the WAN, but also lessen the demand for reliability in the transmissions.

The TCP/IP socket connections between the JCPs and JEPs are of the "stream" variety, rather than "datagram". The underlying network protocol for the "stream" variety ensures delivery of the messages, including error correction and retransmission as necessary. Individual IP packets may arrive at the physical network adaptor in any order, zero or more times, and arbitrarily corrupted. The "stream" socket implementation is responsible for correctly reordering these packets, requesting retransmission of garbled packets, and discarding redundant packets. If transmission of a packet cannot be accomplished and acknowledged in a reasonable amount of time and effort (typically a few seconds), the protocol will simply notify the clients (i.e., the JCP and JEP) that the socket has been disconnected. If a socket is disconnected, the clients will periodically attempt to reconnect the disconnected sockets. A JEP will continue to process jobs arriving from the connected sockets while attempting to reconnect. Thus, job processing is continued even during recovery from a failed node or network link.

The packet size on a typical network is several kilobytes in length. For a fixed-sized packet, the overhead of transmitting a packet is fixed. Because the size of a job is usually shorter than the size of a packet, it would be inefficient to transmit each job as a single packet. Therefore, before transmission, jobs are written into a buffer whose size equals the packet size. The transmitting process packs as many jobs as possible into each buffer, and transmits the entire buffer in a packet to reduce wasted network traffic.

Occasionally, nearly empty packets still need to be transmitted; otherwise if the USP becomes quiescent the final jobs might never be transmitted. Thus, we set a limit on how long data can remain in a buffer prior to it being sent in a packet. If more than, for example, 10 seconds has elapsed since the first job was written into a buffer, the buffer is flushed to the socket, forcing the packet to be physically sent. On the other hand, if we timed it relative to the last job in the buffer, a trickle of jobs arriving every 9 seconds might keep the buffer from being transmitted for several minutes, despite the fact that some of the jobs had been waiting to be transmitted for a long time. The time limit can be reduced if the USP is used in an environment that requires lower latency.

To ensure that jobs will be executed even in the event of a failure, committed jobs are always written to the JCP's job database 26 prior to transmission to a JEP via the socket. When a job is received by the JEP, we know that the job has already been committed to a JCP's database. In the event of a failure, the JCP will scan its job database 26 and retransmit to each JEP those jobs that may not have been executed yet. The JEP simply ignores jobs whose ID indicates the job has already been received and executed.

To keep the JCP's database of jobs from growing arbitrarily large, each JEP has the responsibility of recording the ID numbers of the most recently completed jobs, one number per JCP, every time it commits a transaction. These job ID numbers are counted by a RAM counter, and are used during recovery to tell which jobs have already been executed and can be ignored. The JEP also periodically transmits to each JCP a deletion message containing the RAM counter value for that JCP. When the JCP receives the deletion message, it is free to delete every job with an ID less than or equal to the ID in the message, using wrapping arithmetic (i.e., to delete every job whose ID is equal to the ID in the message, within $2^{31}$ below the ID in the message, or is more than $2^{31}$ above the ID in the message).

A job deletion message cannot carry an ID of a job that has not been executed. If the job is non-synchronized, the job must have been executed to completion and committed. If the job is a synchronized job, duplication of information in the JEP is required. Prior to transmitting a job deletion message with an ID of a synchronized job, the JEP stores a copy of the job in job database 25 and commits it. Storing a copy of the synchronous job is necessary for recovery in the event of a failure; otherwise there would be no persistent record of the job. The associative structure in RAM, which is described earlier in job synchronization, records the mapping from each synchronization tag to the list of jobs in the synchronous group with that tag, including the synchronous job whose ID was transmitted in the deletion message. At recovery time the associative structure is rebuilt from the jobs in job database 25.

When the group's total quorum fraction reaches 1, the group is given the opportunity to collapse into a single job. If a collapse happens, the jobs of the group are deleted from the database and the associative structure, and the single replacement job is stored in place of the group in a single transaction. The single job is treated as a synchronous group with a single member whose quorum fraction is 1.

Whether a synchronous group consists of several original jobs or one single job created by collapsing, when the group is ready to run, the tag of the group is recorded and job execution begins. When a job in the group completes, the job is deleted from the JEP's job database 25, and the next job in the group is started. If it is required to commit a transaction part way through the execution of the group (e.g., to limit the duration of the transaction), the JEP will record the tag of the group, as well as the pointer to the job being executed. If a crash happens during the commit, the remaining jobs of the group will be executed before any other jobs. After all jobs of the group have completed, the next incoming job via any socket connection is processed.

Since each JCP/JEP pair uses consecutive ID numbers for its transmitted jobs, and since deletions occur in the same order as transmission of the jobs, the JEP can safely transmit only some of the deletion messages, with each message requesting a block of jobs to be deleted. When a JCP receives a job deletion message, it deletes all jobs that have an ID less than or equal to the transmitted ID (using the wrapping arithmetic as described above). To reduce the number of job deletion messages, the JEP transmits a deletion message to a JCP only if either the ID of the deletion message crosses a multiple of a pre-determined number (e.g., 1000), or the deletion happened more than a pre-determined length of time (e.g., 10 seconds) ago and no new jobs from the JCP (or from any JCP) have arrived in that time.

Without the latter condition, at most a few thousand jobs will have to be retransmitted for each JCP/JEP pair when recovering from a JEP failure. With the latter condition, the JCP may periodically delete completed jobs in its job database 26 even when no new jobs arrive. The length of time in the latter condition is a trade between the recovery overhead, the deletion overhead, and transmission cost. A shorter time period allows the JCP to delete completed jobs more often, and therefore fewer jobs will be re-transmitted in case of a JEP failure. However, reducing the time limit below 10 seconds in the latter condition is probably not worthwhile, because it would increase the number of deletion transactions that the JCP would have to perform. A significantly smaller value would waste a small amount of CPU time dealing with deletion of jobs in the JCP's job database 26. If a larger value is used, a disadvantageous situation may arise that when a large number of new jobs finally arrive, the JCP may have wasted its idle time and will now have to spend time performing job deletions even though new jobs are ready.

As an alternative perspective, consider the life cycle of a typical non-synchronized job J:

Suppose at some point of time, JCP#1 creates job J. Job J is assigned to run in contention space #2, because J manipulates the data in contention space #2. Assume that contention space #2 is under the control of JEP#2, and job J is assigned a unique ID number 123, one greater than the ID number of the previous job sent from JCP#1 to JEP#2.

The next time JCP#1 commits a transaction, a copy of job J will be written to JCP#1's job database 26. JCP#1's current ID numbers will also be written in the same transaction. Immediately after the transaction has committed, J will be converted into a sequence of bytes and written into a buffer with other jobs bound for JEP#2. When that buffer is full, all the jobs in the buffer will be sent in a packet to JEP#2.

JEP#2 eventually receives the packet from its JCP#1-JEP#2 socket connection. The packet is converted from a sequence of bytes into a sequence of jobs, effectively reconstituting J and the other jobs. The jobs are moved to a queue in RAM, where they are interleaved with other jobs arriving from other sockets. The interleaving preserves the relative order of jobs coming from JCP#1.

Suppose that JEP#2 crashes while J is in the queue. JEP#2 is rebooted, and the socket connections are re-established. When the connection from JCP#1 is re-established, JCP#1 retransmits all jobs in its job database 26, including a copy of J. Some of the jobs that came before J may have already been executed to completion by JEP#2. These jobs are transmitted anyhow by JCP#1, but JEP#2 ignores them. JEP#2 knows to ignore a job when the job's ID is less than or equal to the currently completed job ID that JEP#2 stores in its job database 25. When J is received again by JEP#2, it is placed in the queue in job ID order with respect to other jobs originating at JCP#1.

Eventually JEP#2 removes J from its queue and executes it. JEP#2 increments a RAM counter that indicates it has now executed job 123 (i.e., job J) from JCP#1. Many jobs may be executed prior to and after J in the same transaction, hence the RAM counter may be incremented many times during a transaction.

When the transaction is committed, the current values of RAM counters are written to job database 25, together with the changes in the BDU objects. This operation guarantees that each job affects the BDU exactly once. That is, if J increments a counter in an object, the counter will only be incremented once because of J.

After certain transactions, JEP#2's RAM counter representing the current completed job number from JCP#1 reaches 1005, which is greater than the required value of 1000 to send a deletion message. The new counter value will then be transmitted back to JCP#1 in a job deletion message.

When JCP#1 receives a deletion message with ID=1005, it deletes all jobs in its database with an ID less than or equal to 1005 (using wrapping arithmetic, described above). Since J's ID is 123, which is less than or equal to 1005, it will be deleted. Since there are about a thousand or more jobs being deleted at this time, and since many of them were written out in a single transaction originally, the deletion typically requires very few pages of job database 26 to be written back to disk. Once this transaction commits, there will be no more trace of J in any database or in any processor's memory.

The only network communication that occurred between JCP#1 and JEP #2 was: transmission of jobs from JCP#1 to JEP#2, and transmission of a deletion message from JEP#2 to JCP#1. Transmission of job J occurred twice in the example only because JEP#2 crashed after the initial transmission. The deletion message cleaned up about 1000 jobs with one packet.

Network traffic can be reduced by compressing information transmitted on the network. A simple compression scheme, for example, may be one that reduces the size of a job. Because a job is an object, and each object is an instance of some class that defines the structure and behavior of that object, we may define jobs as instances of different subclasses of a class "Job". Jobs may be created to update instances of a class "Address" or a class "Person". Hence, a class of jobs includes jobs whose tasks are directed toward a class of objects. When the JCP encodes an instance of a class of jobs into bytes for the first time, the name of that class is transmitted along with an encoding of the job object. The class is then added to the list of encountered classes and given a unique number. The next time an instance of this class is transmitted, the class's unique number is transmitted instead. The compression scheme thus effectively reduces the overhead of transmitting a job.

To improve the efficiency of each JEP, a technique which we call OID-sorting can be used. In this technique, at the start of a transaction in which jobs are to be executed, all available jobs are first sorted by the unique object identifier of the object, if any, that will be modified by the job. If multiple objects may be modified by running a job, one can be chosen arbitrarily. If a job creates an object, the identifier of the container which will contain the new object is used for sorting. Execution of the jobs then proceeds through this list in order.

Because the sorted list of jobs might not be completely executed in a single transaction, we must record enough information in the database to reconstruct the remaining jobs during recovery, should a failure occur. This information includes the first and last job id numbers of jobs in the list, for each source of jobs (jobs are assigned unique id numbers only relative to the JCP/JEP pair that the job is transmitted from/to). This lets us reconstruct the exact same list of jobs at recovery time, but we must also record how many of these jobs have actually been executed whenever we commit a transaction. That information allows perfect recovery from a failure. During recovery of a failed JEP we must wait for each JCP to retransmit at least those jobs that participated in the sorted list of jobs that was being executed at failure time.

When the entire sorted list of jobs has completed, job deletion messages can then be sent to each JCP that provided the jobs that were executed. Sending deletion messages before this point is still reasonable, as long as the persistent counter that says where we are in the list is relative to the end of the list, rather than the start. Otherwise, when some of the early jobs in the list have been deleted, they will not be resent to the JEP at recovery time.

There are several reasons for sorting jobs by the unique object identifiers of the object affected by the job: Since object identifiers encode the physical location of an object so that object identifiers that are close together numerically represent objects that are closer together physically therefore fewer pages from the database may need to be examined/written per transaction. Multiple writes to the same page will be aggregated together into a single physical write. Fewer containers may need to be locked per transaction—the high bits of the object identifier specify the container, and the low bits specify the object within that container. The pages that are written at commit time have strong physical proximity on the disk, so seek times will be reduced.

To ensure that at recovery time the exact same list of jobs is produced, the sorting criterion must break ties consistently. Thus, after considering the object identifier of the object being updated, ties must be broken by further sorting based on the originating JCP# and the job's id number. This pair of values is guaranteed unique, and is sufficient to unambiguously break ties (arbitrarily).

Because each change to an object can potentially cause much work to be done (e.g. re-indexing the object as described below), we may wish to avoid this situation when possible. Thus, when a job is asked to execute, it may examine the list of jobs that affect the same object (these jobs come after the current job in the sorted list). The changes represented by these jobs can then be collapsed together into a single update operation, which in our example would allow re-indexing to occur only once for this set of changes. Jobs can carry timestamps if appropriate, to identify the order in which to perform conflicting changes.

Besides ordering jobs based on the location of the data being modified by them, one may wish to prioritize jobs based on how urgently they must be completed. There might not be any urgency to complete a batch job, but an object-updating job triggered directly by a user should probably run as soon as possible. Several basic mechanisms exist to support this need.

In a deadline-based soft real-time priority scheme, each job has associated with it a time. It is strongly desirable that the job complete by this time. Unfortunately, this interferes with OID-sorting. To resolve this conflict, the following algorithm is used. At any point in time a JEP has a heap of jobs, sorted by expiration time. The job execution process looks at the top element of the heap. This is the job with the earliest deadline, possibly in the past if we're temporarily overloaded. Jobs are popped from the heap until we've popped either a job more than 5 seconds in the future, or all the jobs, whichever comes first. We then sort these jobs in OID order and attempt to run as many of them as possible in a transaction. If we don't finish running them all in a single transaction (because for example more than 10 seconds have elapsed in that transaction and 10 seconds is the maximum configured transaction time), we commit the transaction and continue executing these jobs in the next transaction.

To deal with deletion of completed jobs in this scheme, we look to the solution that was already described for synchronized jobs. A synchronized job is considered "dealt with" when a copy has been committed to the database of its JEP. At this time (or some time thereafter), a message is sent back to the JCP indicating that the JCP may delete its copy of that job. To support OID-sorted execution (i.e., execution not in job id order), we must commit copies of all jobs, not just synchronized ones, to the JEP's database.

Referring again to FIG. 1. BDU 22 in data processing center 191 may contain millions of objects. To locate an object in the BDU, information about the object, including its location or other attributes, is stored and arranged for efficient access in a parallel (concurrent) processing environment.

For a data processing center 191 of an insurance company, for example, each of the BDU objects may represent a record for a person insured under a certain type of policy. When there is a change in the features of that type of policy, an insurance agent may wish to locate all the people insured under that type of policy and notify them of the change. To efficiently locate the people, a file that includes pre-sorted entries may be used. Each of the pre-sorted entries contains a pointer to one person's object and other information that is essential in identifying the person. For example, the insurance agent may use a file that has entries for all the people insured under a given type of policy, pre-sorted by last name.

When objects are created, deleted, or updated, the corresponding entries in the file must be updated. To assure that all jobs that create, delete, or update objects will consistently modify the corresponding pre-sorted entries, the jobs must agree upon a common mechanism and a common format to make necessary changes on the file, the pre-sorted entries, and the objects. The format of the file and the pre-sorted entries are designed to facilitate searching and locating a desired object, and therefore, the format or layout of information in a pre-sorted entry is typically the same as other entries in the file.

The common mechanism pre-defines what attributes of an object are used for pre-sorting the corresponding entry, what information is displayed in the entry, and how changes in an object should propagate to the entry. We call the common mechanism an Asynchronous Index Manager (AIM), the file an index, and the pre-sorted entry an index entry.

In a database system that allows tens of thousands (or more) of simultaneous data accesses, it is crucial to maintain the integrity of the index while avoiding access conflicts. The AIM defines how indices should be structured and maintained. The task of executing the changes in the index is carried out by jobs scheduled by the USP. For example, when an object is added or deleted, new jobs are spawned to add or delete the corresponding index entries in the appropriate indices. Similarly, when updating an object would have an effect on the accuracy of index entries, jobs are spawned to update the appropriate indices that contain the affected index entries.

The index is similar in concept to a card catalog used in a library for locating specific books. The card catalog holds index cards, each of which contains information about a book. The information may include a brief summary of the book, as well as other necessary information for a user of the card catalog to locate the book in the library.

Books may be looked up by any one of multiple criteria, such as by author, title, or subject, and the index cards representing the books are sorted by a search criterion for efficiency. A given catalog typically holds information for a collection of things of the same type. For example, there may be separate catalogs of books, catalogs of periodicals, or catalogs of audio media (e.g., tapes or CDs). All the index cards in a catalog have the same layout in terms of how the information is organized; for example, the title of a book is at the top of every index card and the author's name is below the title.

The index used for locating objects in the BDU is conceptually similar to a card catalog. An index contains a collection of index entries (index cards), each of which contains a small summary of an object (book). Objects identified within an index are of the same type, i.e., the same class in an object-oriented terminology. Index entries within an index have the same data structure. Index entries may be sorted or hashed by a pre-defined key, depending on the intended access pattern and the size of the index.

Each index has key and non-key attributes that can be defined by a system administrator. The key attributes are used for sorting or hashing an index entry, and the non-key attributes are displayed in the index entry together with the key attribute. The display of the non-key attributes allows certain pre-defined information about the object to be viewed by a user of the index without having to retrieve the object from the BDU. In the library example, an index card sorted by the ISBN may contain information including the book title and the author.

Figure 5:
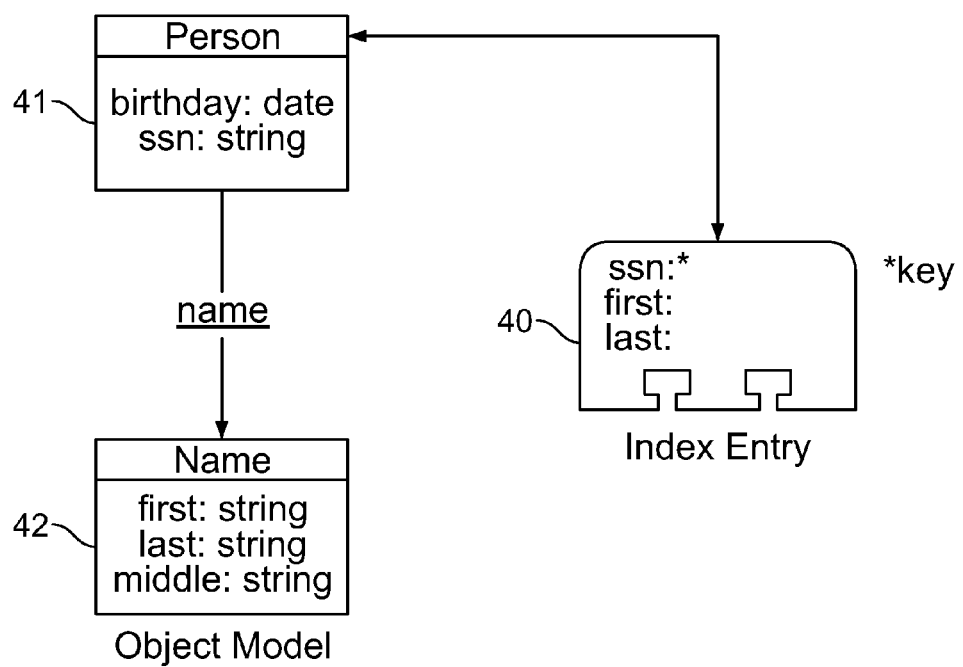
FIG. 5 illustrates an index entry.

FIG. 5 is a diagram of an index entry. Every person in the database has a corresponding index entry 40 in an index called Person-SSN, which means the index contains a class of person objects, represented by respective index entries sorted by the key attribute SSN. Each index entry of the index contains the SSN, a person's first name and last name, and a pointer to a person object 41, which in turn points to a name object 42 containing more information about the name of the person.

Indices and index entries may be stored on disks and in memory. Storing a copy of the index in memory can reduce index access time and therefore increase the processing speed of locating an object. The copy of the index in memory is implemented as a memory-resident (i.e., RAM-resident) search structure (e.g., a binary search tree or hash table). When a user submits a request for updating a BDU object, the resulting update job not only updates the BDU object, but also updates the associated indices. The search structure must be updated in lockstep with the changes in the BDU and indices on disk. Because each index update is a consequence of executing a job that updates a BDU object, the job is given an additional responsibility of maintaining the consistency of search structures with BDU objects and the indices on disk. In case of a JEP failure, at recovery time the JEP rebuilds the search structure in memory by scanning the BDU.

Modifications to a BDU object may not take place immediately after a modification request is sent, because changes in the BDU are not reflected until a transaction is committed. Modification to the memory search structure, however, could happen immediately. If a user submits a query for information about an object that has not been committed to the BDU, the object cannot be located. An object identifier (OID) may not have been assigned for such an uncommitted object. In this case, the user may simply discard the result from the query. The situations that updates in database may lag behind updates in search structure may sometimes arise in a standard database system. If an object has not yet been written to a standard database system, we will not be able to find the object. An alternative scheme to handle this situation is not to change the search structure immediately when executing a job, but rather to accumulate the changes and apply them immediately after a transaction is committed.

Figure 6:
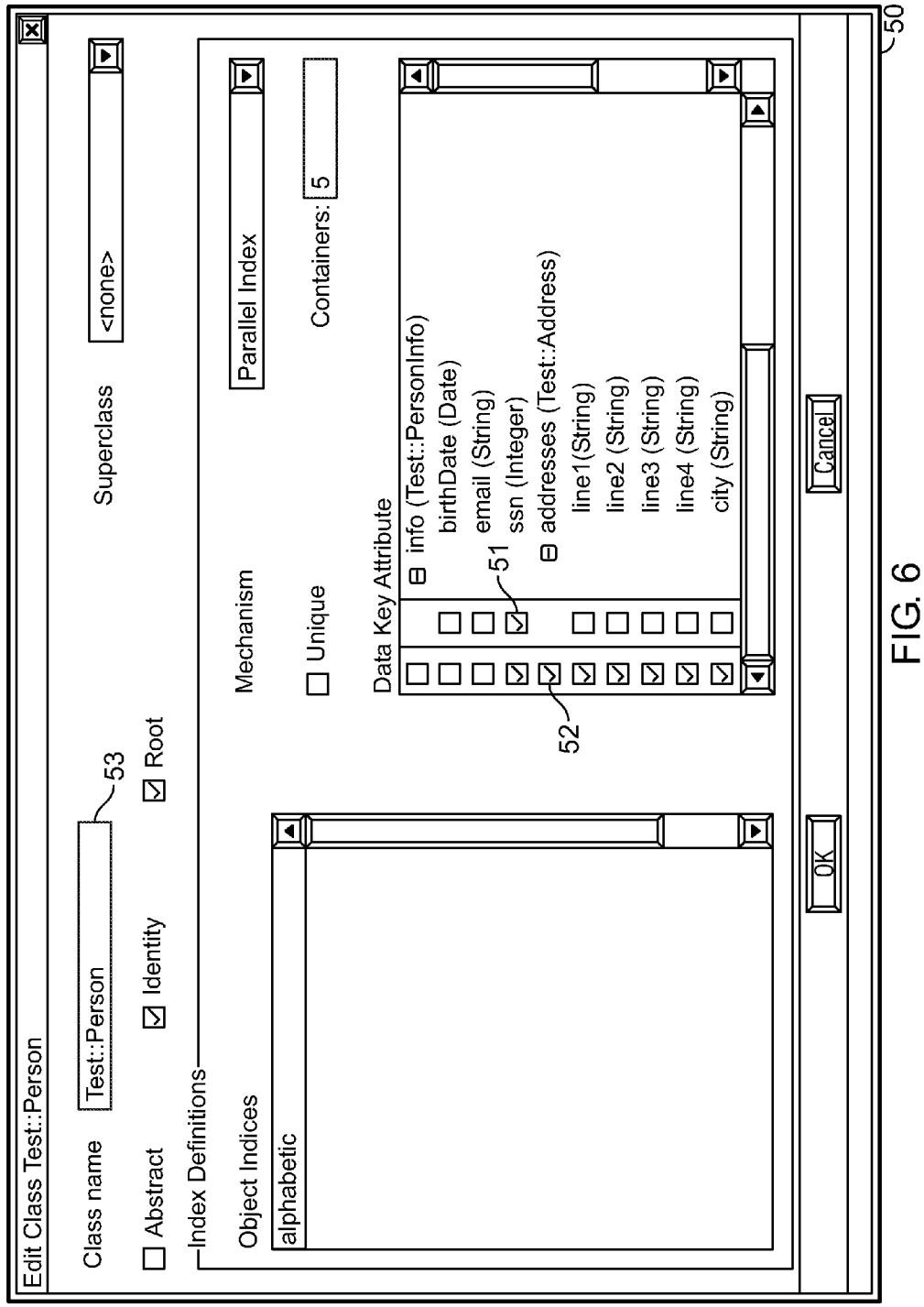
FIG. 6 illustrates a user interface for a class editor.

FIG. 6 is a user interface called a class editor 50 with which a system administrator may define an index for a class of objects. Generally, an object can be categorized by an object type, such as person type or product type. An object type may include multiple classes; for example, a car insurance company may classify its policyholders as people with comprehensive coverage and people with liability coverage. Each of the classes has at least one corresponding index. Each index has a key attribute and non-key attributes, which can be edited from the class editor.

Figure 7:
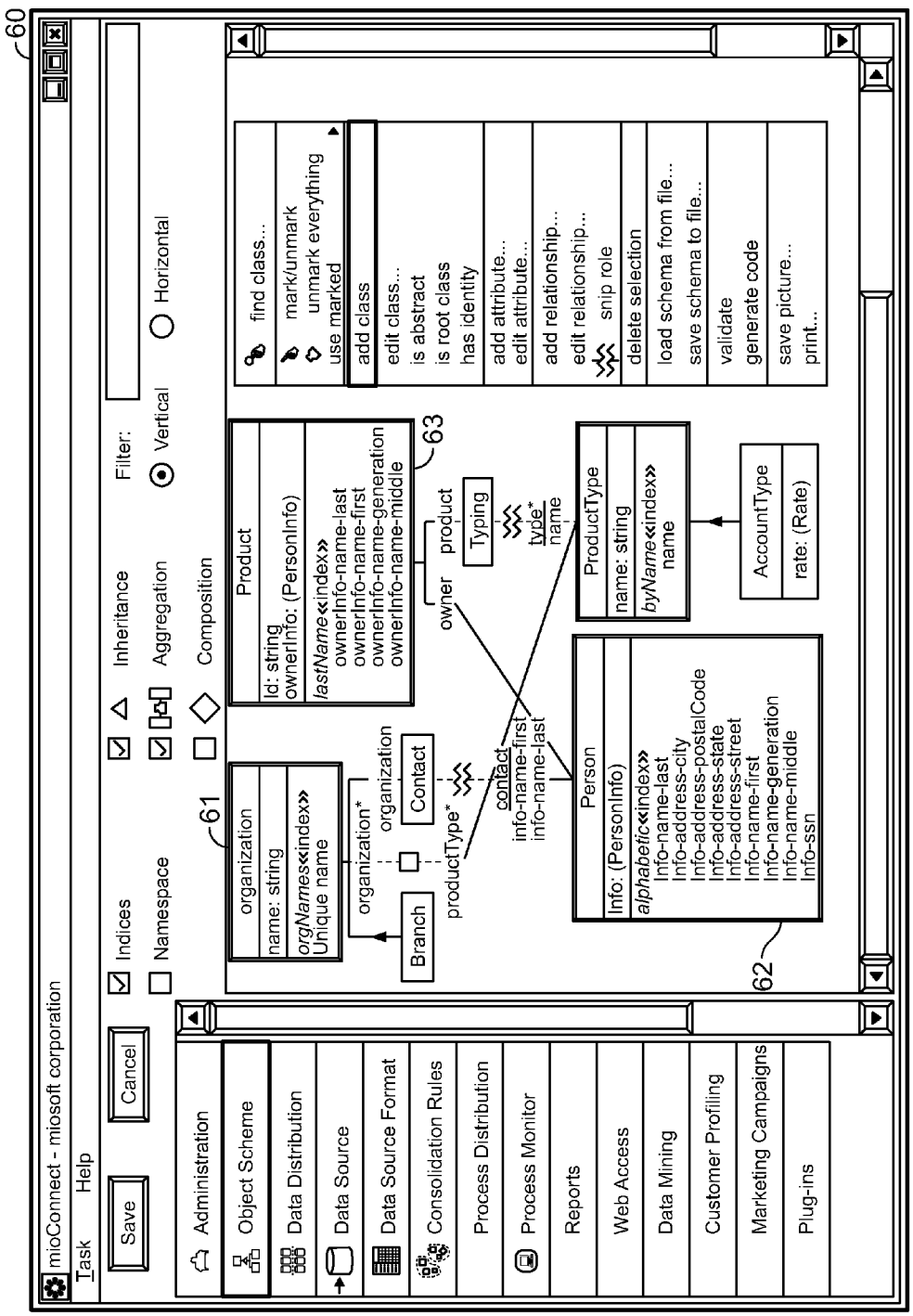
FIG. 7 illustrates a display of a schema.

Class editor 50 allows a system administrator to choose a key 51 for an index he creates or edits and to select the non-key attributes 52 he wishes to store in the index entry. In FIG. 7, the index being edited contains a class of Test::Person 53. The key of the index is SSN, and each index entry of the index contains information about the SSN, the address of the person, and the postal code for the person's address (not shown).

Since a person may have more than one address, more than one postal code may be associated with that person. For efficiency in locating all persons having the same postal code, where the postal code is a key in an index, multiple index entries are created for a person who has multiple addresses, one index entry per address.

To find out what indices are defined, a system administrator can open an object schema window to edit and display a schema that contains the definitions of the indices. FIG. 7 shows an object schema window 60 that displays the definitions of object classes (61, 62, and 63) and their associated indices and attributes. The schema contains layouts of classes for the objects in the database. Each class layout describes the physical structure of instances of that class in terms of attributes and relationships. Additionally, the schema describes how to distribute objects among databases and processors without contention, how to parse input files that are to be loaded into the database, and how to consolidate data from multiple sources.

Every time a request for a task that involves adding, deleting, or updating an object arrives at the USP, the request is sent to a JCP 350 to create one or more jobs that act on the request. The JCP uses the information in the schema to find out which indices are defined for that object class, and what the keys are for the indices. JCP 350 then determines necessary changes to the indices, such as adding, deleting and updating index entries, and decides the sequence of jobs that need to be created in order to update the indices and to complete the task. Each requested action has a different requirement on the order in which objects and their respective index entries are modified. The requirement must be strictly enforced to maintain the integrity of the indices.

Figure 8:
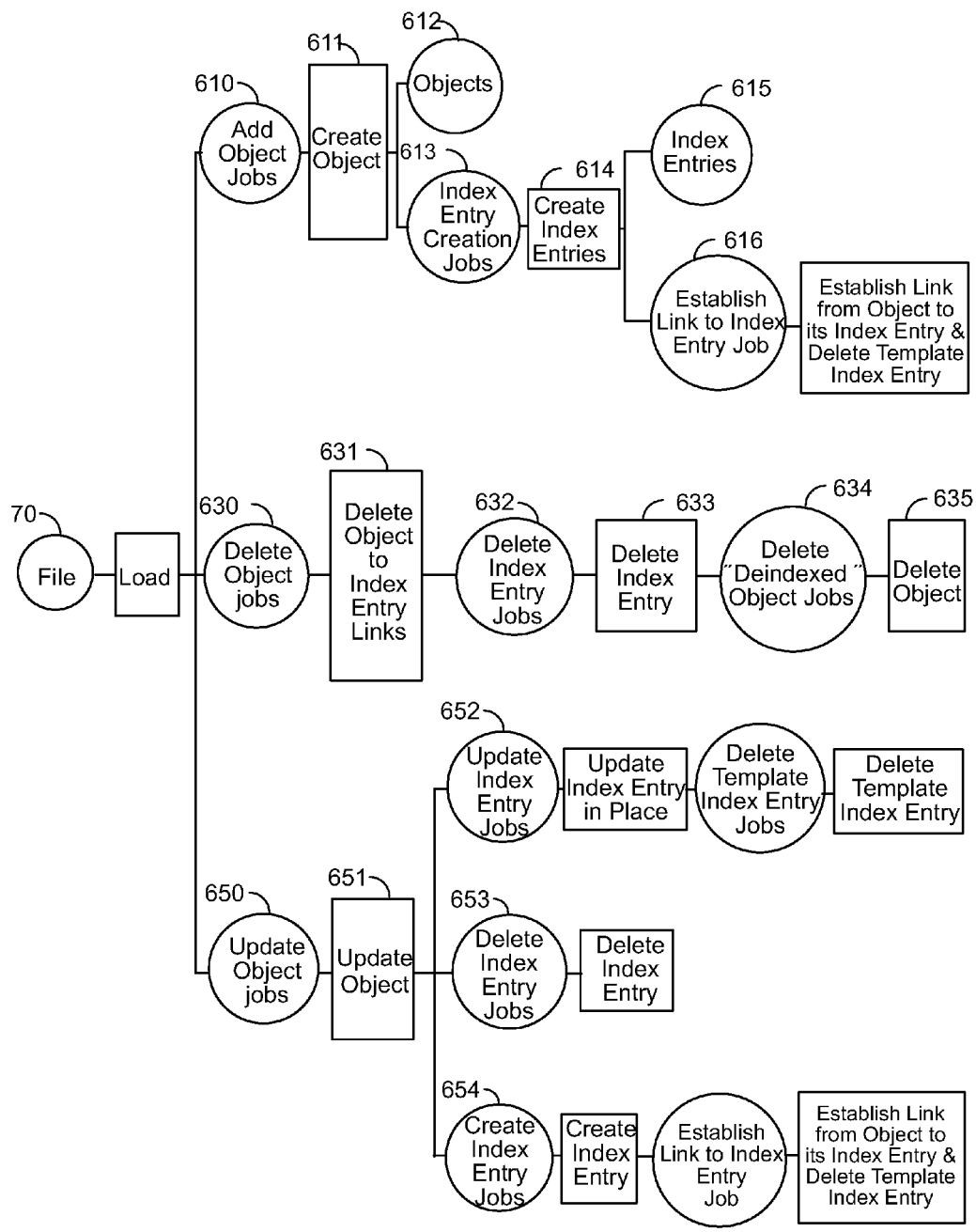
FIG. 8 is an example showing the process of modifying an index when loading a file.

FIG. 8 illustrates an example of an index modification process for loading a file 70. File 70 may require adding 610, deleting 630 and updating 650 objects in BDU 22. For example, file 70 may contain customer records of a new division that was just acquired by an insurance company. The acquired customer records may contain duplicated information or more up-to-date information about existing customers, or contain information about new customers. To consolidate the acquired customer records with the existing customer records, jobs are created to add, delete, and update the BDU objects representing the customer records. As an example of the jobs that are created and the order in which they must be done, when deleting an object (630), links between the object and its index entries must be deleted first (631). Then jobs are produced to delete all the index entries referring to the object (632, 633). After the index entries are deleted, another job is spawned to delete the object (634, 635). The index entries must be deleted before the object is deleted; otherwise, another process may use one of the index entries to access the object while the object has been deleted.

In some implementations such as Objectivity/DB®, the pointer to an object is reused. The pointer to an object is called an object identifier (OID) and includes four 16-bit unsigned integers that specify the object's database, container, page number, and page slot in the storage. The index entry of the deleted object contains the OID of the deleted object, but the OID may have been reassigned to another object that is added to the same database, container, and storage location as the deleted object. Therefore, if an object is deleted before its index entries, one of two error conditions may happen: either a process may try to access a non-existent object, or the process may refer to the wrong object.

To avoid contention in deleting an object and its index entries, jobs that carry out the deletions of an object are scheduled by the USP. The jobs may be scattered over several contention spaces. Each of the jobs causes another "response" job to be spawned to indicate its completion. The response jobs are synchronized and loaded into the contention space where the object resides. When all the response jobs arrive in the execution cell (as determined by the completion of a quorum), all the response jobs are collapsed into a single job that deletes the object.

The ordering of steps for adding an object is the reverse of deletion. When adding (610) an object, the object must be created before any index entries can refer to it. When an object is created (611, 612) and stored in a persistent memory, "insert" jobs are spawned (613), each creating an index entry (614, 615) and each executed in an appropriate contention space. Note that these jobs are created in the same transaction as the object creation; otherwise the object might end up stored without the corresponding jobs, if a failure occurs. Then jobs are created to establish links between the object and its index entries (617).

When updating an object, the update may have no effect on any of the object's index entries. For example, a person's color preference may be stored in the person's object, but not in any of the index entries. In this situation, no update is needed for the index entries. In other examples, the update may require the index entries to be updated or deleted, or require new index entries to be created. For example, if a person's address is changed and address is part of the information stored in the person's index entry, the index entry must be updated. If the person bought another house in another postal area, and the index is keyed (i.e. sorted) by postal code, a new index entry containing the address of the person's new house needs to be inserted.

In the process of updating an object, JCP 350 creates a job to update the object (650, 651) before updating any of its index entries. In the example of updating a person's address, although the index entry contains the old address before the index entry is updated, the OID contained in the index entry that points to the person's object is still current. Therefore, an updated object can still be located by using the old index entry. When updating an object, JCP 350 figures out and produces a list of index entries that should exist after the update. This list is then compared with the current list of index entries attached to the object to determine which re-indexing jobs need to be performed, that is, which index entries should be updated (652), created (654), deleted (653), or remain unchanged.

If an index entry should be deleted (653), it is first disconnected from the object, then JCP 350 creates a job to delete the index entry. This job sends back a reply job to the object indicating completion. This reply job is necessary for a wait-free algorithm described below. If an index entry should be added, JCP 350 creates a job that contains enough information to create the index entry in the appropriate contention space, and then sends back a response job to the object indicating the index entry that was created. If an index entry should be updated, JCP 350 creates a job that contains enough information to update the existing index entry, and then sends back a response job to the object indicating completion. If an index entry should remain unchanged, there is nothing to be done.

To assure that re-indexing jobs work correctly when multiple overlapping changes occur to an object (i.e., changes that happen before the index entries have all been brought into agreement with the object), a wait-free algorithm is used. As will be described below, the wait-free algorithm allows changes in an object while the object has outstanding jobs, and further avoids contention between all the re-indexing jobs. The object reserves a two-bit field for an index entry update operation: a re-indexing indicator and a pleaseReindex indicator. The re-indexing indicator indicates that there are outstanding re-indexing jobs that have not yet sent back the response jobs. The pleaseReindex indicator indicates that the object was changed before its re-indexing jobs were completed. Responses from the individual re-indexing jobs are synchronized. The synchronization allows all the re-indexing responses to collapse into a single job when all the responses are present in the object's corresponding execution cell. The single job updates a list of index entries attached to the object. Immediately after the update, the object's pleaseReindex indicator is examined. If the indicator is set, it indicates that the object has changed during the re-indexing that was just finished. Another re-indexing operation according to the new change will start right away.

A request for deleting an object may arrive during a re-indexing operation. Deletion requests have priority over update requests, because any updates on the object and its index entries vanish after the object is deleted. An additional reserved two-bit field is used in the object: one is deleting, and the other one is pleaseDelete. Deleting bit indicates if the object is in the process of being deleted, and pleaseDelete indicates if there is a request for deleting the object. When either bit is set, the pleaseReindex indicator is ignored, and subsequent requests to update the object are also ignored.

If a user only wishes to read certain information about a BDU object, the user may send a query. Queries, unlike most other jobs, do not create changes in objects, index entries, or indices. In the embodiments of the USP using TCP/IP sockets, queries may be handled as query jobs to reduce the amount of data transmitted via a network. When a requestor submits a query for locating a BDU object, a JCP converts the query into a query job, which is then sent to the JEP of the contention space in which the requested object resides. Each query job has an ID, which is used for the originating JCP to match a result with the corresponding query. The query job is not given a sequencing number as other jobs that are sent over the network. If the query job is lost in network transmission on the way to a JEP, it is up to the requestor to re-submit the query (possibly after a time-out). The handling of lost queries is reasonable for customers accessing a company's databases from the World Wide Web using Web browsers (such as Microsoft's Internet Explorer).

When a query job is received by the JEP, instead of adding it to the queue of ready jobs, the query job may be added to a different queue, the queue of query jobs. Between ordinary jobs, and even between the steps of an ordinary job, this queue of query jobs may be examined. If there is a query job waiting, the query is executed immediately, and the result is sent back to the originating JCP, with the job's ID attached. Because query jobs only read data in the BDU, allowing the query to precede other jobs does not introduce any ordering problems.

An object in the BDU may be located not only with an index, but also with links connecting the object to other related objects. Many BDU objects are related to each other. For example, referring again to FIG. 1, data processing center 191 of an insurance company may store its policyholders' objects and product objects in BDU 22. Suppose a policyholder Bill has earthquake insurance, which means that an "ownership" relationship exists between an object representing Bill and a product object representing earthquake insurance. If a user of the system wishes to locate the product object owned by Bill, one way is to retrieve Bill's object, look for which insurance policy Bill has, and locate an index entry of earthquake insurance in an index of insurance product objects. Alternatively, information about the earthquake insurance may be retrieved by establishing a direct link between the object of Bill and the product object of earthquake insurance. Using the direct link, information related to an object of interest (e.g., an insurance product object) may be retrieved directly without going through an index.

The direct link between objects is called a relationship. A relationship may be, for example, an ownership or a parentage. Relationships between objects can be built by a mechanism called an Asynchronous Relationship Manager (ARM). A system administrator only needs to define a relationship between specific classes of objects, and jobs will be automatically created to build the relationship between the corresponding instances of the classes (i.e., objects) according to the ARM mechanism.

The ARM defines how relationships should be structured and maintained for a system that allows millions of simultaneous accesses, such as in a large-scale distributed database system. The ARM provides an environment and a set of common rules to guarantee the integrity of the relationships as objects are added, modified, or deleted across the distributed databases.

For example, if the insurance company decides to stop carrying the earthquake insurance that Bill has, the ARM guarantees that the relationship between Bill and the earthquake insurance will be automatically deleted before the product object of earthquake insurance is removed from database. The task of executing the changes in the relationships is carried out by jobs scheduled by the USP to allow high throughput and efficiency. For example, when an object is added or deleted, new jobs are spawned to add or delete the associated relationships. Similarly, if updating an object requires its relationships to be updated, jobs are spawned to update the appropriate relationships.

Jobs executed by JEP 300 may be jobs that add, delete, or update a BDU object. Changes in the object may require related objects in the BDU to be added, deleted, or updated. The related objects that need to be added, deleted, or updated can be identified and located by following the relationships between objects. Once the related objects are found, JEP 300 spawns new jobs to update the related objects.

New relationships between classes can be defined in a user interface as shown in FIG. 7. The user interface displays a schema window 60, which allows the system administrator to add and delete relationships between classes of objects, for example, an organization class 61, a person class 62, and a product class 63.

When a new relationship is defined, each object in one class must be linked to a corresponding object in another class. Similarly, when a new object is created by a JCP 350, new relationships between the new object and other existing objects must be established. To locate the existing objects in a relationship, JCP 350 uses an index for all the objects in BDU 22. From the information stored in the schema, JCP 350 knows which index to select and how the information is sorted within the index. The JCP creates another job for establishing a relationship between each existing object and the new object.

To establish a relationship between objects that may be distributed across multiple processors and databases, additional jobs and objects have to be created to manage the message-passing between objects and synchronous operations. More specifically, a relationship may be implemented as a set of interconnected role objects, one role object for each class. FIG. 10 and FIG. 6 illustrate the process for establishing relationships for a newly created object 1 with existing object 2 and object 3. Object 1, object 2 and object 3 are instances of class 1, class 2 and class 3, respectively, and the objects are shown in FIG. 9 as C1, C2 and C3, respectively.

First, a role object R1 is created by a job J1 for object C1 (510 and 620). Then jobs J$1a^t$ and J$ib^t$ are created and sent to C2 and C3 (622), each with a pointer pointing to R1 (520). The superscript 't' indicates that J$1a^t$ and J$1b^t$ carry a tag and a quorum fraction for spawning synchronous jobs. J$1a^t$ and J$1b^t$ create roles R2 and R3 (640 and 660), and send pointers (531, 532) connecting R2 and R3 back to R1, respectively.

J$1a^t$ and J$1b^t$ further spawn synchronous jobs Ear and J$1b1^s$ (530, 642 and 662), and send them back to R1 (643 and 663). The superscript 's' indicates that J$1a1^s$ and J$1b1^s$ are synchronous jobs, such that neither J$1a1^s$ nor J$1b1^s$ may execute until both are ready to run. Before running, J$1a1^s$ and J$1b1^s$ are collapsed into a single job, which contains information about R2 and R3 carried by J$1a1^s$ and J$1b1^s$, respectively. The information includes the pointers that point to R2 and R3 (531 and 532), and pre-determined cache information of C2 and C3, which will be described later. The single job records the pointers and caches the pre-determined cache information in R1 (624).

After the single job completes, it spawns final creation jobs J2a and J2b and sends them to R2 and R3 (626), respectively, with the information of R1, R2 and R3 (540). R2 and R3 use the information to record the pointers of the other two (541, 542, 543 and 544) and cache the information about the other two, respectively (644 and 664). The relationship is not available to an object until its role has the information of all of the other roles (680).

After a relationship is established, a user of the system may wish to see all the relationships of an object to be displayed, together with certain information about the other objects participating in the relationships. To increase the performance of displaying the information, the role of the object caches information about other objects with which its object has relationships. For example, a person may have many relationships to other people, products and organizations, which are usually scattered across multiple databases. It is inefficient to retrieve information about the scattered objects across multiple databases. Therefore, role objects cache information from the other objects in the relationship.

FIG. 11 illustrates a user interface 80 that allows a user to select cache variables to be cached in a role object participating in an ownership relationship. The user may indicate the cache variables by marking the attributes in a column 81 labeled as "Data" on the top. A summary of all relationships of an object, including the cached information about other objects in the relationships, can be quickly displayed in a list.

Every role has a version number that increases when its associated object is modified. When the version number of the object is changed, a message is sent to the other roles of the object's relationships so that the values of the object cached in the other roles can be updated accordingly. The version number cycles back to 0 every 65536 versions.

Every role also tracks the version of all other roles that it currently has cached, and the number of versions missing for each other role. A version may be missing because messages containing version numbers may be delayed for variable lengths of time during transmission over a network, thus causing out-of-order reception. The number of missing version numbers for each other role indicates how many outstanding messages from that role are yet to be received. A role may not want to delete itself if outstanding messages are about to arrive.

To compute the number of missing versions, the role takes the received new version number and subtracts the current version number. The difference minus one is added to a running total that indicates the number of missing versions. When a version less then the current version is received, the difference between the current version and the received version is computed, and the running total of missing versions is decremented by one. For example, if the current version is 6 and a version 10 arrives, we record the fact that 10−6−1=3 versions are still expected (7, 8, 9). After version 10 has arrived, receiving old version 8 means there are still 2 old versions in transit (7 and 9).

A relationship may be deleted as a result of an associated object being deleted or updated. It is also possible to delete a relationship because it is no longer necessary. When a relationship is deleted between objects, an algorithm for the relationship deletion guarantees the correctness of the deletion even in the presence of simultaneous delete requests from different objects in the relationship. The algorithm guarantees that there will never be a message arriving for a role that has been physically deleted even though the USP does not guarantee the order in which the messages arrive.

The deletion process begins when an object tells one of its roles to delete that role's relationship. This role is called the initiator. At schema definition time, one of the role classes of the relationship is arbitrarily selected as the coordinator role. The coordinator is allowed to be the initiator.

If the initiator is already marked for deletion, it indicates that deletion is already in progress and the relationship will eventually be deleted. Thus, the initiator does nothing. Alternatively, if the initiator has not been marked for deletion, it marks itself for deletion and sends a message 1 to the coordinator role. The final version number of the initiator is passed along in the message 1. The version number is used to order role cache update requests (i.e., when an object changes, all roles that participate in relationships with the object's role are asked to update their caches with the new information). Because it is marked for deletion, the initiator role ignores subsequent changes to the initiator role's object, and does not send change messages to the other roles.

When the coordinator receives a message 1, it increments a counter indicating how many neighboring roles have been marked as deleted. If this was the first such message, a message 2 is sent to each role.

When message 2 is received by a role, the deletion flag is examined. If the role is already marked for deletion then it means that a message 1 was already sent to the coordinator from this role. So the role simply records that the message 2 has arrived and sends no reply. Otherwise the role marks itself as deleted and sends a message 1 to the coordinator to indicate this.

These rules for messages 1 and 2 guarantee that the coordinator will receive exactly one message 1 from each role, and will receive that message only after that role has been marked deleted. This is true even if there are multiple initiators, each attempting to trigger deletion of the relationship.

When the counter in the coordinator indicates that all roles have been marked as deleted (because the coordinator has received a message 1 from each role), the coordinator sends a message 3 to each role to indicate it is safe to physically delete it.

These message 3's are the last messages sent to the roles from the coordinator. Since each role was already marked as deleted prior to this, they have also stopped sending cache-updating messages to each other. However, there may be messages that were sent long ago that still have not arrived (because the USP does not guarantee ordering of messages). To avoid physically deleting a role before all messages have arrived at it, each role has an array of version numbers, one for each other role. The version number records the latest version number among the received messages for the corresponding role. Another array maintains an outstanding message count for each other role, the count indicating that how many messages have not yet arrived from each other role. The outstanding messages are typically cache-updating messages.

The algorithm guarantees only one message 3 will ever arrive at a role, and it carries an array of final version numbers for all the roles. When this message arrives, a ready-to-physically-delete flag is set. If the counters inside the role indicate that there are no outstanding incoming messages, the role is immediately deleted. Otherwise, whenever an old cache-update message finally arrives at the role, the counters are updated and, if they indicate all messages have arrived and the role is marked as ready-to-physically-delete, the role is physically deleted from the database.

Message 2 can arrive at a role after message 1, if the role is an initiator. A flag in each role indicates whether the message 2 has arrived yet, and physical deletion is postponed until the message 2 has arrived (as well as any outstanding cache-updating messages, as described above).

The following is a brief summary of the information contained in the three types of messages:
Message 1 ("A role has been marked for deletion.") contains:
The role that was marked for deletion.
The final version number of that role.
Message 2 ("Please mark for deletion on behalf of coordinator.") contains:
The coordinator role's final version number.
Message 3 ("Physically delete role when old messages are all accounted for.") contains:
The final version number of each role.

At the moment a role is marked as deleted, that role should be disconnected from its object. Thus, from the viewpoint of the object, it appears that the deletion has already happened.

As an example, consider three connected roles, R1, R2, and R3, where R2 is the coordinator. Referring to FIG. 12 and FIG. 13(*a*)-(*f*), suppose that the deletion is initiated at R1 (810, 820). Also assume that there is an outstanding cache-updating message from R1 to R3 that is in transit for the entire example. The example reflects the steps taken by each of the roles.

R1: I'm not yet marked (811), so I'll mark myself deleted (813) and send a message 1 to R2 (814), the coordinator. It will contain my final version number, FV1.

(Suppose that there are no cache-updating messages in transit from R1 to R2.)

R2: Receiving message 1 from R1 (830), I record in my table of role version numbers that FV1 is the current version for R1 (835). I see that there are no cache-updating messages in transit from R1 to R2. I now send out a message 2 to each role (R1, R2, and R3) (837). This message contains my final version number FV2.

R1: I receive the message 2 (831), but since I already marked myself as deleted, I simply record the coordinator's (R2's) final version number.

R2: I receive the message 2 (831). Since I have not yet marked myself deleted (832), I mark myself deleted (833) and send a message 1 to the coordinator (i.e., myself) (834), including my final version number FV2.

R3: I receive the message 2 (831). Since I have not yet marked myself deleted (832), I mark myself deleted (833) and send a message 1 to the coordinator (R2) (834), including my final version number FV3.

(Suppose that R2 receives message 1 from R3 before it receives message 2 from R2.)

R2: I receive message 1 from R3 first. I record R3's final version number in my array of current versions (835). Since I have only received two message 1's (from R1 and R3), I do nothing else.

R2: I receive message 1 from R2 next (831). Since this was my 3rd message 1, I now know all final version numbers of all roles, as well as the fact that they're all marked for deletion. Therefore I send a message 3 to each role (838), passing the final version numbers FV1, FV2 and FV3 in each message.

(Suppose that after R1, R2 and R3 receive message 3 from R2, there is no outstanding message for R1 and R2, but one outstanding message for R3.)

R1: I receive message 3 from R2, indicating I can physically delete myself. I reconcile the final version numbers against my current versions (839). That is, I check for outstanding messages in my array of outstanding message counts, I see that there are none. Therefore I delete myself (840).

R2: I receive message 3 from R2, indicating I can physically delete myself. I reconcile the final version numbers against my current versions (839). That is, I check for outstanding messages in my array of outstanding message counts, I see that there are none. Therefore I delete myself (840).

R3: I receive message 3 from R2, indicating I can physically delete myself. I reconcile the final version numbers against my current versions (839). That is, I check for outstanding messages in my array of outstanding message counts, I see that there is one outstanding cache-updating message from R1. I mark myself as ready-to-physically-delete and wait for the next message (841).

R3: I receive the final outstanding cache-updating message from R1 (842), note that it arrived, and notice that it was the last message I was waiting for and that my ready-to-physically-delete flag is set (839). I then physically delete myself from the database (840).

Referring again to FIG. 9, messages for deleting a relationship may sometimes arrive when a role is in the process of creating the relationship. To prevent a message from being sent to a non-existent role, the role will complete the creation job before it deletes itself. If a role receives a deleted message before it has received the final creation job (J2*a* or J2*b*), it will mark itself as deleted and wait until the final creation job is received. As soon as the final creation job is received, the role will proceed with processing the delete message.

Appendix A contains source code of an implementation of the invention for use on a system in which VisualWorks SmallTalk 5i.1 is installed with an Objectivity/DB 5.2.2 database system.

Other embodiments are within the scope of the following claims. For example, the invention could be implemented on a database that is not an object database, such as a relational database. In an object database, the data objects can be referred to as data items, and the data object attributes can be referred to as data elements. In a relational database the data records could be considered the data items and the data fields could be considered the data elements.

What is claimed is:

1. A method comprising
accepting tasks from task sources, at least some of the tasks being associated with deadlines for execution,
defining, for each of the tasks, jobs for concurrent execution by processors, the jobs requiring access to data that is stored persistently in a database and being assigned to the processors,
causing a processor to execute two or more jobs assigned to the processor in an order based on the deadlines associated with the tasks for which the two or more jobs are defined, and
causing the processor to execute other jobs assigned to the processor than the two or more jobs to be executed in an order based on locations of respective data to be accessed by the other jobs within the database.

2. A method comprising
maintaining a database that stores data persistently,
accepting jobs for concurrent execution by processors, the jobs requiring access to data in the database, and
causing each of the processors to execute at least some of the jobs, by accessing the data in the database, other than in the order in which the jobs are received for execution, the jobs being assigned to the processors based on characteristics of items of the data to be accessed by the processors.

3. The method of claim 2 in which the items of the data comprise objects in an object database.

4. The method of claim 2 in which the items of the data are provided as objects to an object-oriented application.

5. The method of claim 2, 3, or 4 in which the at least some of the jobs to be executed by one of the processors are replaced by a single aggregated job.

6. The method of claim 5 in which the jobs that are replaced have been pre-identified as requiring execution as a synchronization group to ensure correctness of results, all of the jobs of the synchronization group being associated with information that identifies them as members of the group and defines their respective fractions of a quorum.

7. The method of claim 2, 3, or 4 in which each of the processors determines an order in which to process at least some of the jobs based on physical locations on disk of the data that must be accessed by the jobs.

8. The method of claim 7 in which the processing order is determined based on a page structure of data on the disk.

9. The method of claim 7 in which the jobs are clustered for processing so that accesses to a given physical portion of the disk are clustered.

10. The method of claim 2, 3, or 4 in which at least some of the jobs to be executed by a processor are redundant, and the processor does not execute the redundant jobs.

11. The method of claim 10 in which the redundant jobs are identical, and fewer than all of the identical jobs are executed.

12. The method of claim 10 in which some of the redundant jobs supersede others of the redundant jobs and only the superseding jobs are executed.

13. The method of claim 12 in which the redundant jobs have associated time stamps and the superseding jobs have later time stamps than the superseded jobs.

14. A method comprising
accepting jobs for concurrent execution by processors, the jobs requiring access to data that is stored persistently in a database and performing various actions with respect to the data, the actions being associated with respective indices,
causing each of the processors to execute at least some of the jobs in an order determined by the actions to be performed by the jobs with respect to the data, and
updating the indices associated with the performed actions.

* * * * *